US008775645B2

(12) United States Patent
Solotorevsky et al.

(10) Patent No.: US 8,775,645 B2
(45) Date of Patent: Jul. 8, 2014

(54) SYSTEM AND METHOD FOR GENERATING POLICIES FOR A COMMUNICATION NETWORK

(75) Inventors: Gad Solotorevsky, Even Yehuda (IL); Natan Krisi, Kiryat-Ono (IL); Svetlana Meltzin, Rosh-Haayn (IL)

(73) Assignee: Cvidya Networks Ltd., Tel Aviv (IL)

( * ) Notice: Subject to any disclaimer, the term of this patent is extended or adjusted under 35 U.S.C. 154(b) by 933 days.

(21) Appl. No.: 10/495,495

(22) PCT Filed: Nov. 13, 2002

(86) PCT No.: PCT/IL02/00910
§ 371 (c)(1),
(2), (4) Date: May 13, 2004

(87) PCT Pub. No.: WO03/043253
PCT Pub. Date: May 22, 2003

(65) Prior Publication Data
US 2005/0010571 A1    Jan. 13, 2005

Related U.S. Application Data

(60) Provisional application No. 60/331,212, filed on Nov. 13, 2001.

(51) Int. Cl.
*G06F 15/16* (2006.01)
*G06F 15/173* (2006.01)
*H04L 12/56* (2006.01)
*H04L 12/54* (2013.01)

(52) U.S. Cl.
CPC ............... *H04L 47/822* (2013.01); *H04L 12/56* (2013.01)
USPC ............................. 709/229; 709/226; 709/238

(58) Field of Classification Search
CPC ............................ H04L 47/822; H04L 12/56
USPC ..................... 709/238–244; 707/1, 2, 8–10
See application file for complete search history.

(56) References Cited

U.S. PATENT DOCUMENTS

| 5,295,244 | A | * | 3/1994 | Dev et al. | 715/853 |
|---|---|---|---|---|---|
| 5,504,921 | A | * | 4/1996 | Dev et al. | 709/223 |
| 5,586,129 | A | * | 12/1996 | Chan | 714/805 |
| 6,078,953 | A | * | 6/2000 | Vaid et al. | 709/223 |
| 6,086,619 | A | * | 7/2000 | Hausman et al. | 703/6 |
| 6,094,687 | A | * | 7/2000 | Drake et al. | 709/241 |
| 6,151,601 | A | * | 11/2000 | Papierniak et al. | 707/10 |
| 6,473,793 | B1 | * | 10/2002 | Dillon et al. | 709/223 |
| 6,490,572 | B2 | * | 12/2002 | Akkiraju et al. | 706/19 |
| 6,688,983 | B2 | * | 2/2004 | Yoshizawa | 463/42 |
| 6,745,221 | B1 | * | 6/2004 | Ronca | 718/104 |
| 6,775,701 | B1 | * | 8/2004 | Pan et al. | 709/226 |
| 6,845,106 | B2 | * | 1/2005 | McKinnon et al. | 370/477 |

(Continued)

*Primary Examiner* — Richard G Keehn
(74) *Attorney, Agent, or Firm* — Browdy and Neimark, PLLC

(57) ABSTRACT

According to a broad aspect of a preferred embodiment of the invention, a network optimization method is provided. First, a set of input parameters describing a network and the users accessing it is analyzed. Input parameters may include such network-related information as network element inventory and topography, bandwidth capacity, routing information, etc. Customer-related inputs may include contact revenue, cost of service, non-performance penalties, and pattern-based customer importance profile and customer relationship management. Other inputs may include additional complex network and customer related business rules. Demands are estimated (530), graphed (530), and then the graph is pruned (580).

5 Claims, 18 Drawing Sheets

Evaluating an ordered list of contracts

(56) References Cited

U.S. PATENT DOCUMENTS

| | | | |
|---|---|---|---|
| 6,996,066 B1 * | 2/2006 | Liu | 370/238 |
| 7,027,403 B2 * | 4/2006 | Porikli et al. | 370/238 |
| 7,171,661 B1 * | 1/2007 | Pinera et al. | 717/172 |
| 7,184,398 B2 * | 2/2007 | McKinnon et al. | 370/230 |
| 7,376,718 B2 * | 5/2008 | Gould et al. | 709/220 |
| 7,856,497 B2 * | 12/2010 | McKinnon et al. | 709/224 |
| 2001/0033557 A1 * | 10/2001 | Amalfitano | 370/335 |
| 2002/0010772 A1 * | 1/2002 | Kusano | 709/223 |
| 2004/0023660 A1 * | 2/2004 | Ben-Eli | 455/450 |
| 2004/0136379 A1 * | 7/2004 | Liao et al. | 370/395.21 |

* cited by examiner

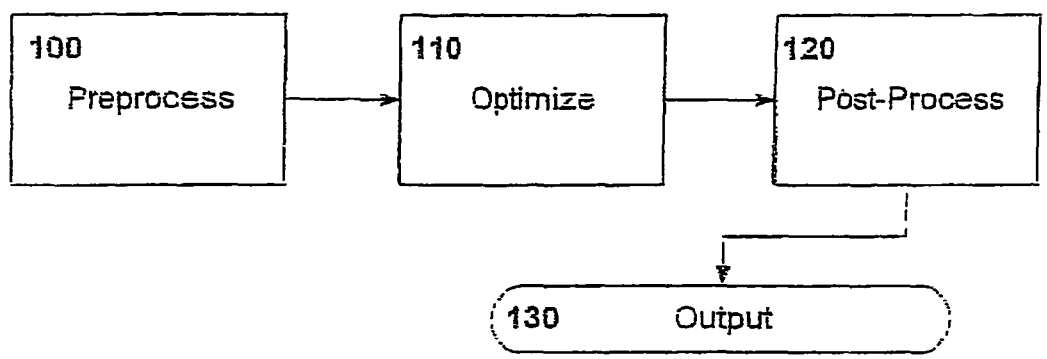
Figure 1: Optimization Overview
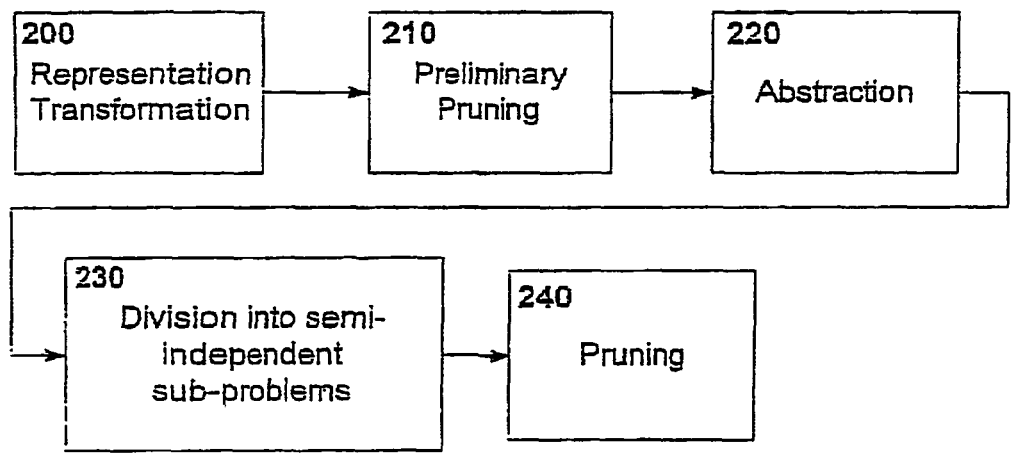
Figure 2: Pre-processing Overview

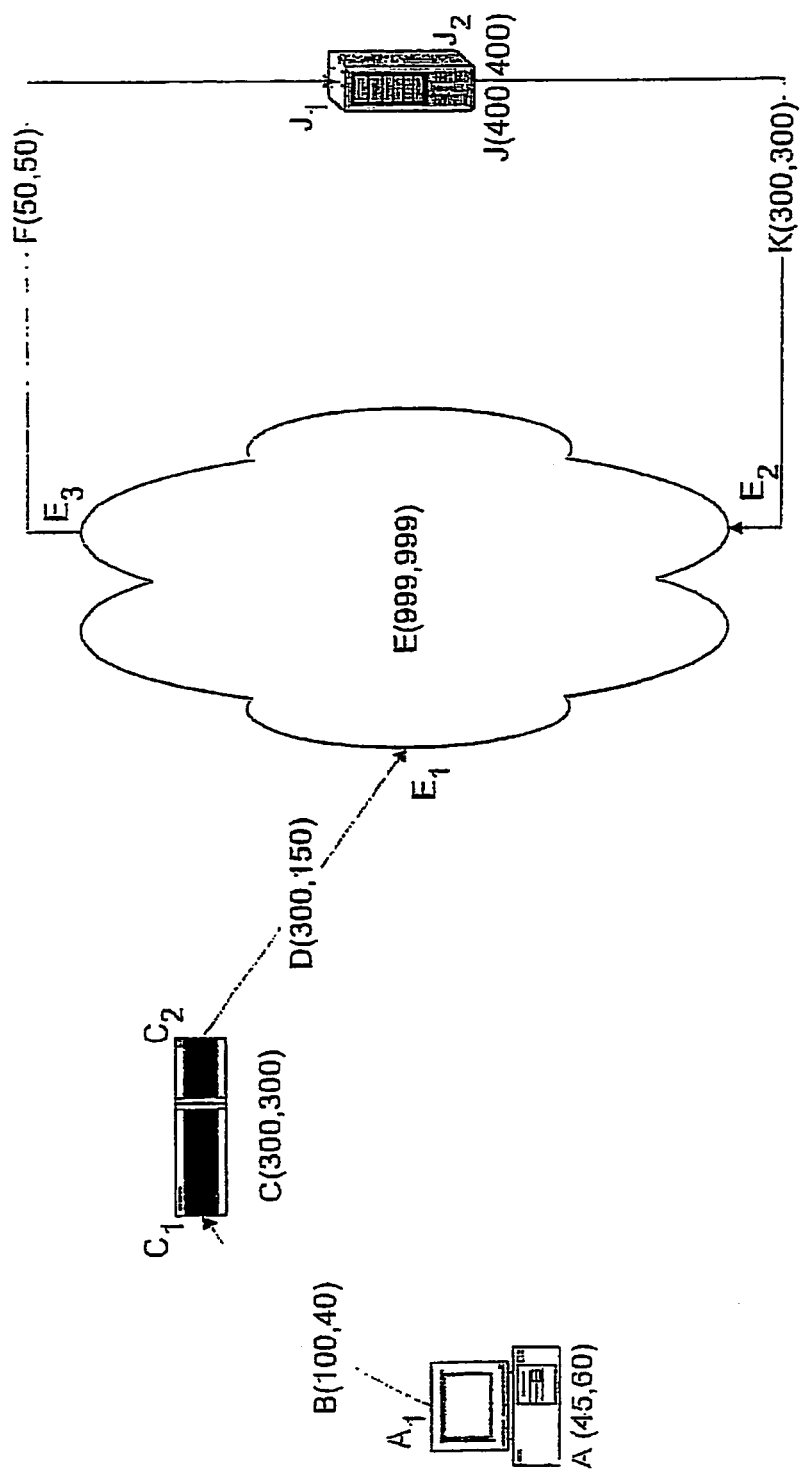
Figure 3: A simple Network - the letters with the sub-script represent ports

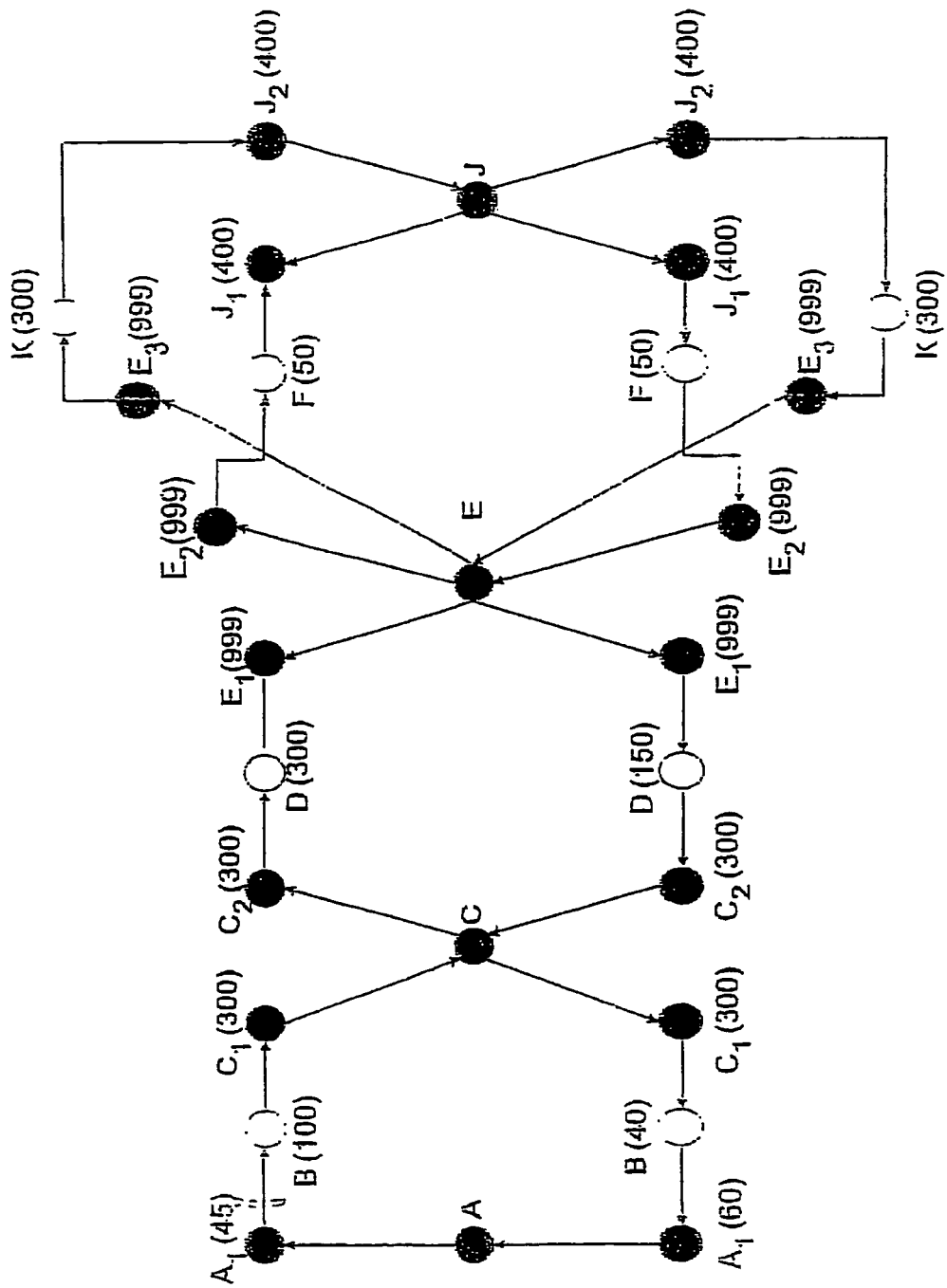
Figure 4: The graph representation of the network
(Assumes that all the ports of a network element have the same throughput)

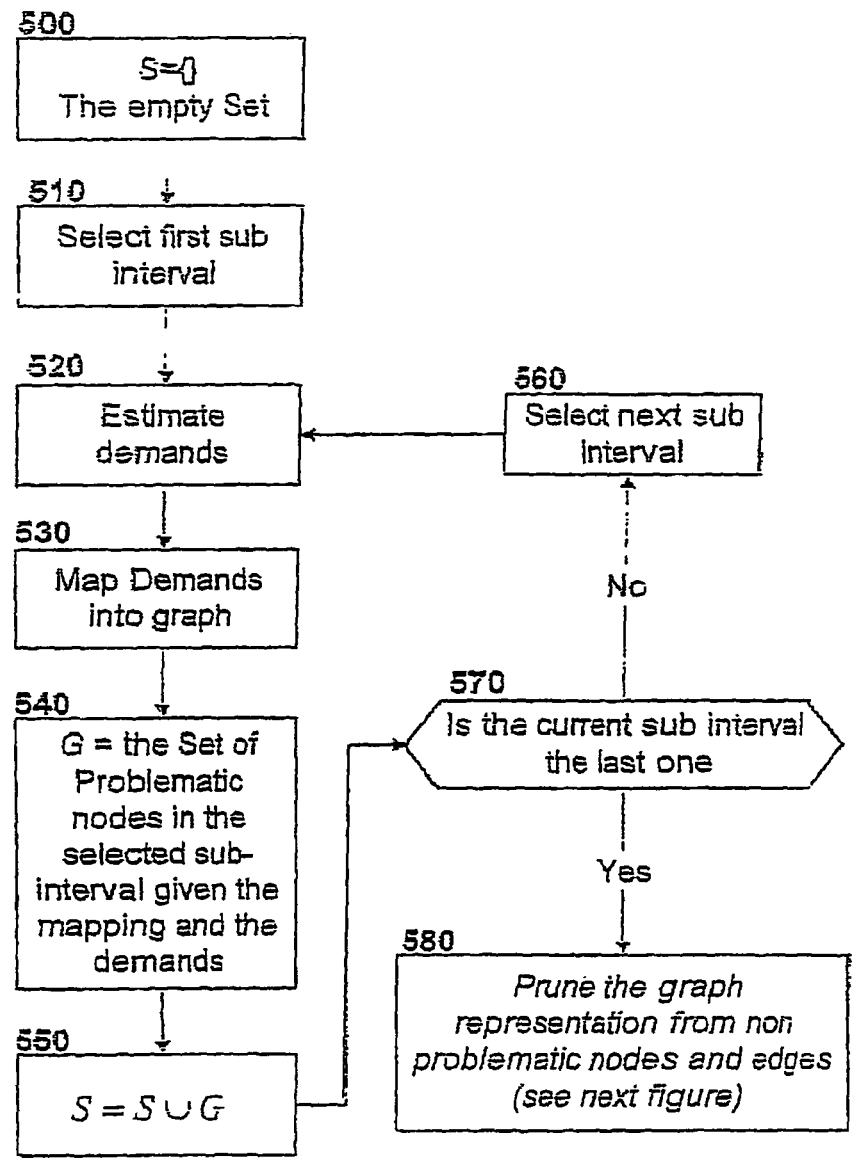
Figure 5: Preliminary pruning, selecting the elements to prune

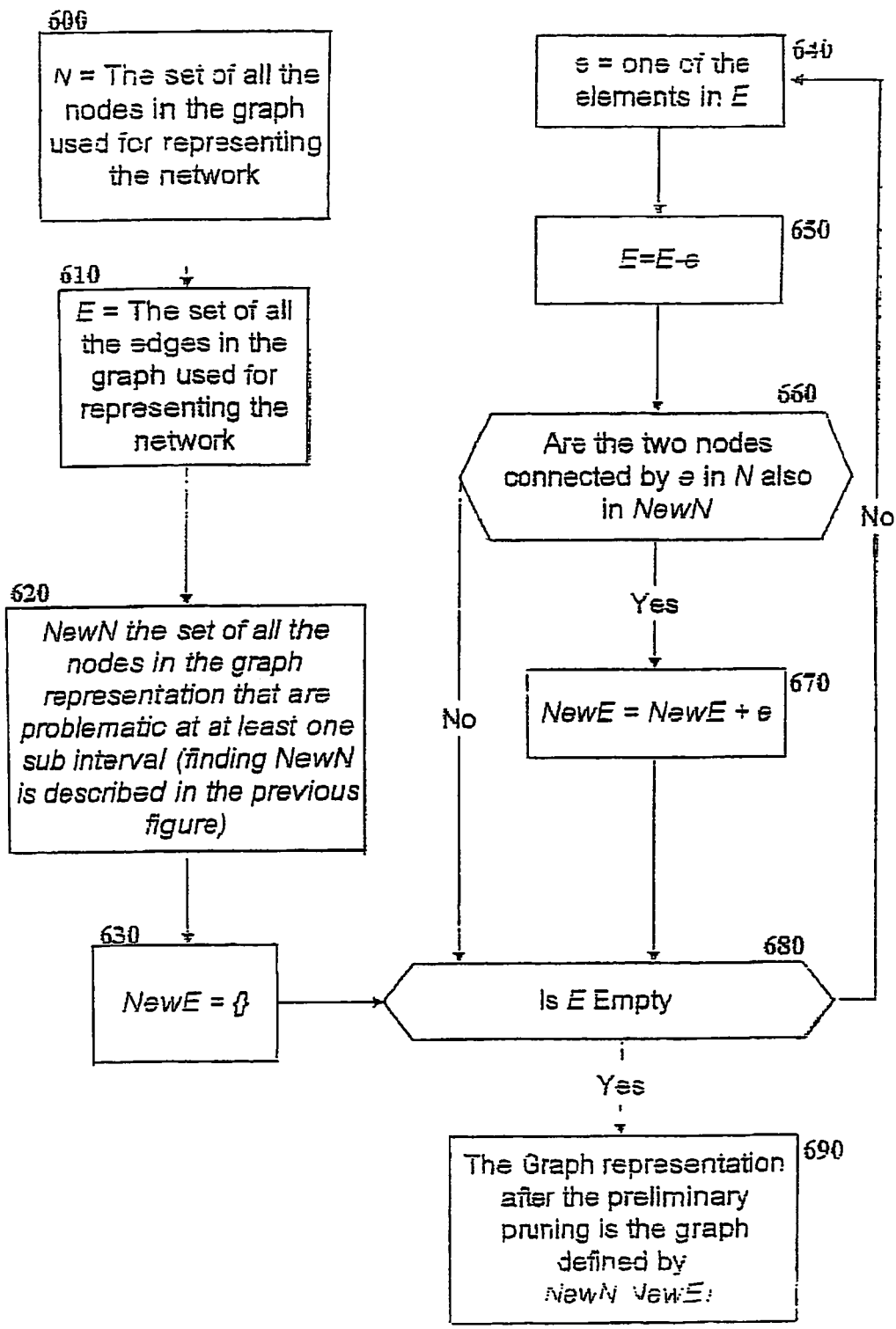
Figure 6: Preliminary pruning, doing the pruning

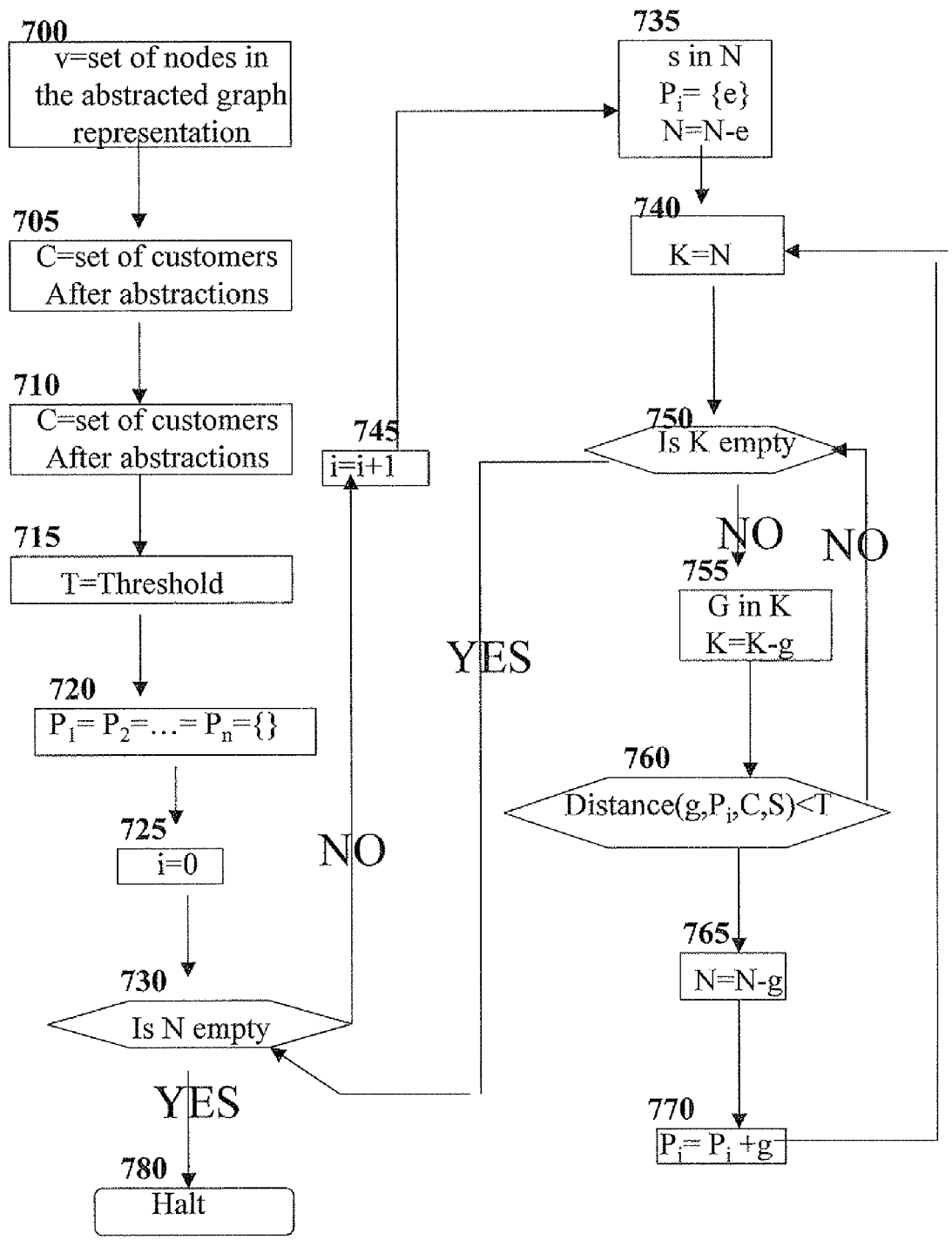
Figure 7: Division into semi-independent sub-problems

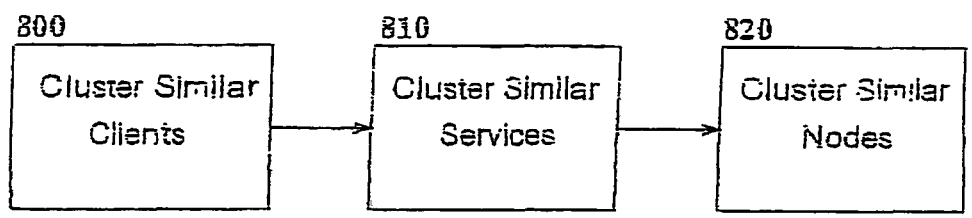
Figure 8: Abstraction Overview

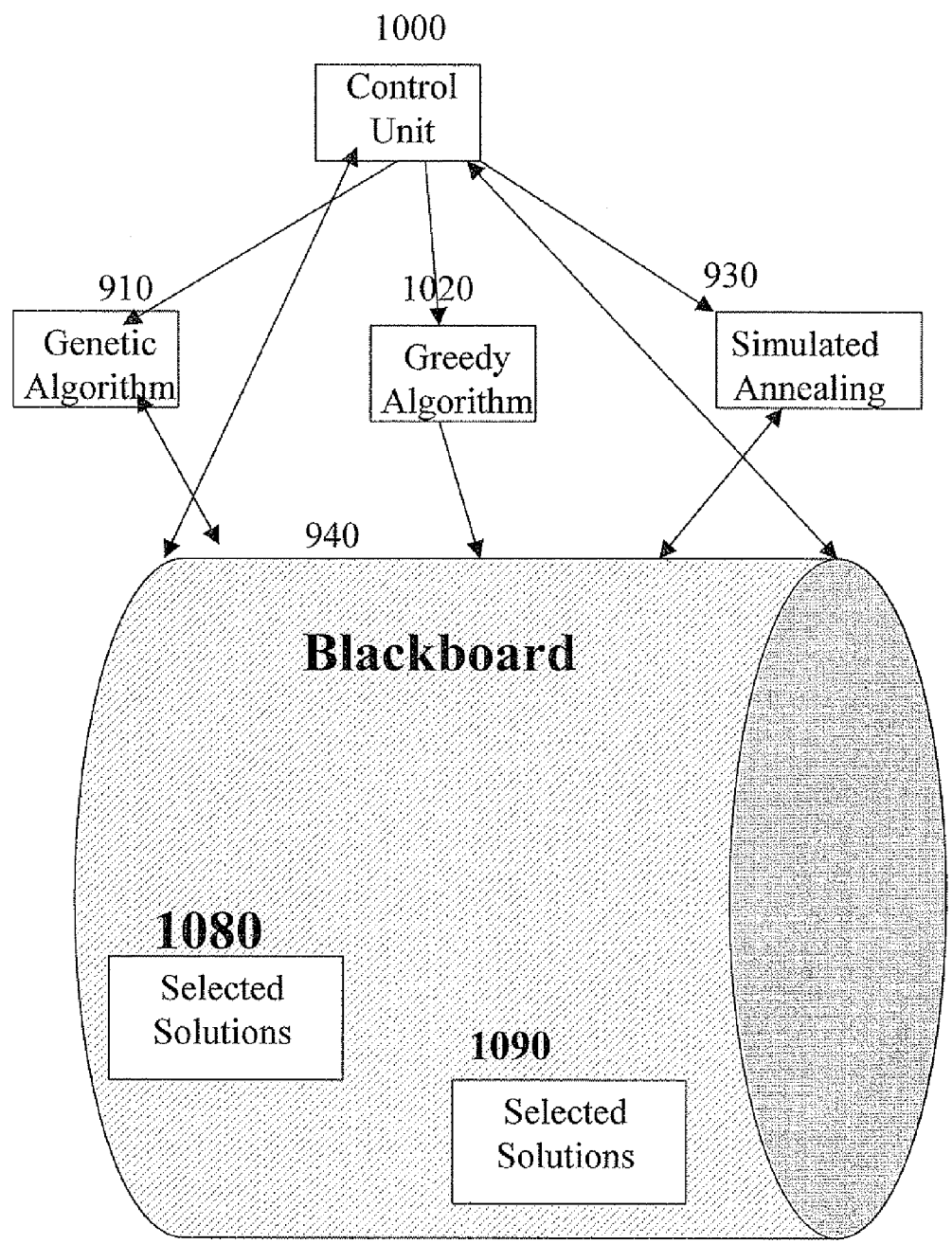
Figure 9: Basic blackboard architecture

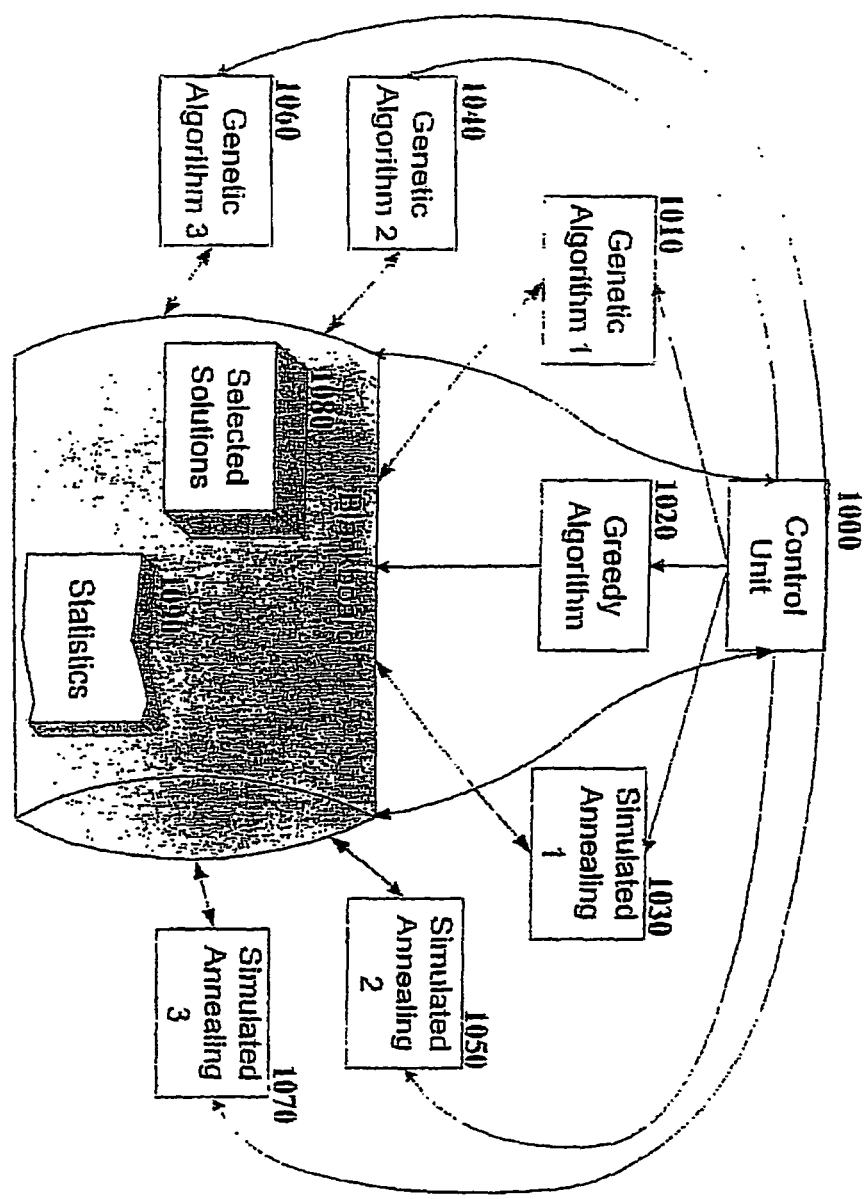
Figure 10: Multiple instances of the algorithms running in parallel

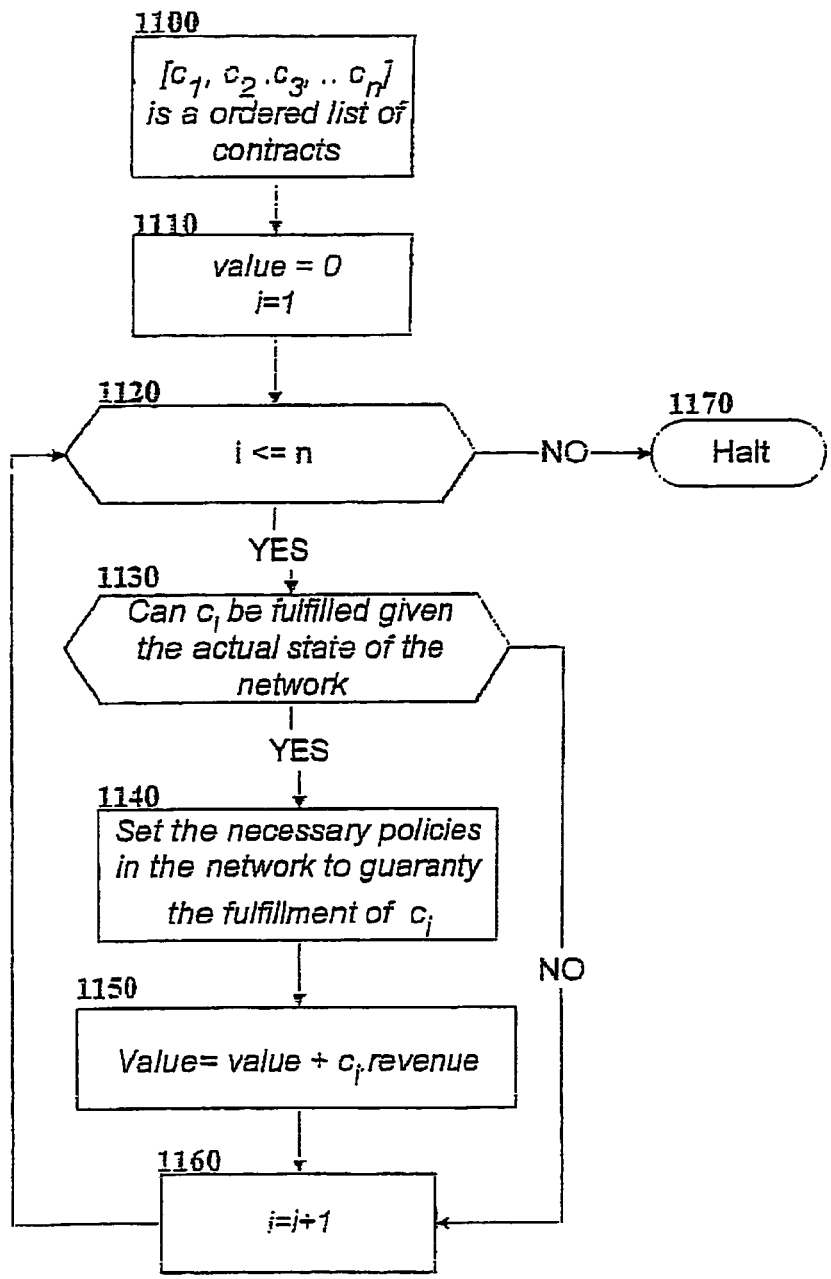
Figure 11: Evaluating an ordered list of contracts

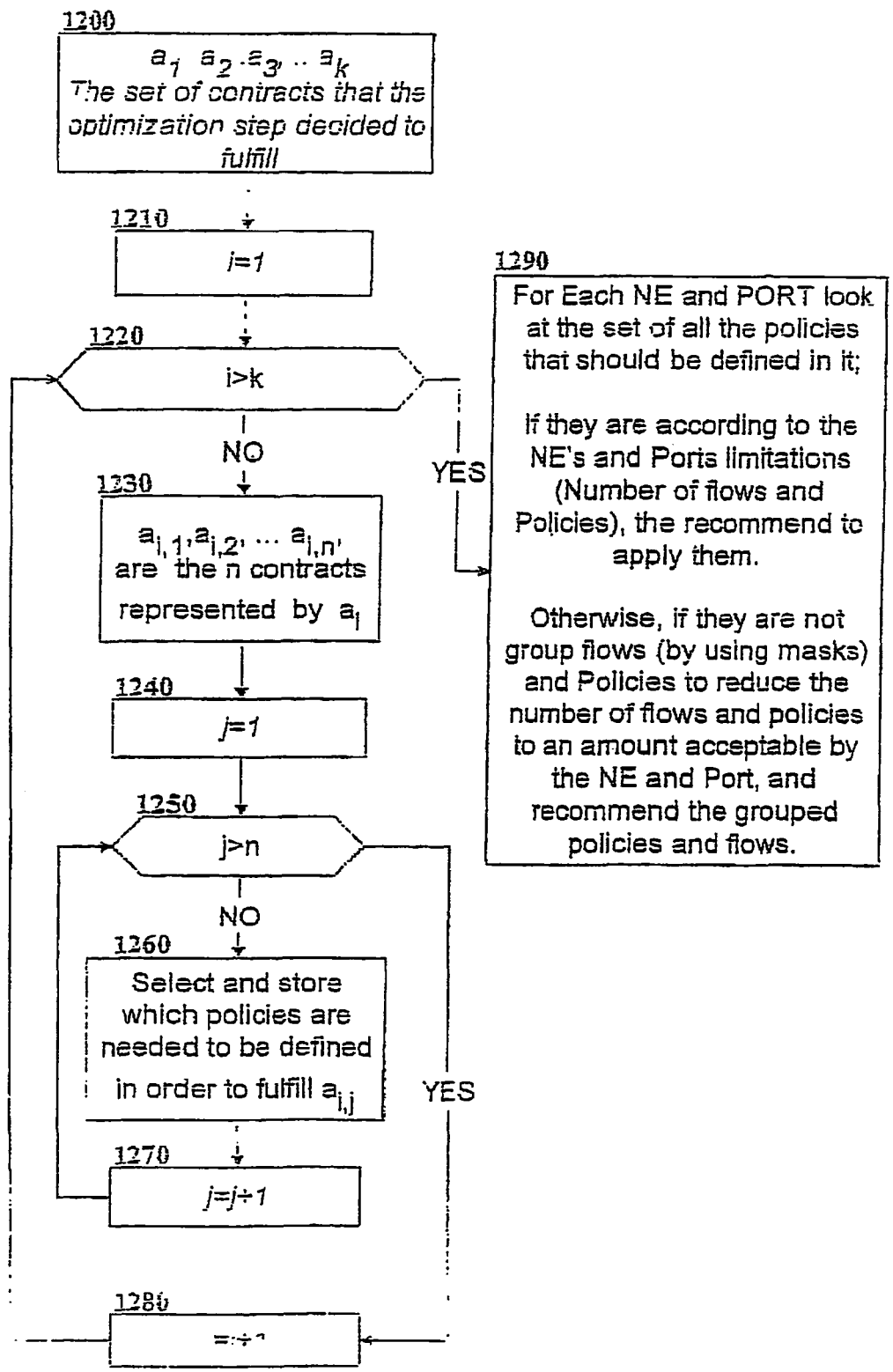
Figure 12: Post processing

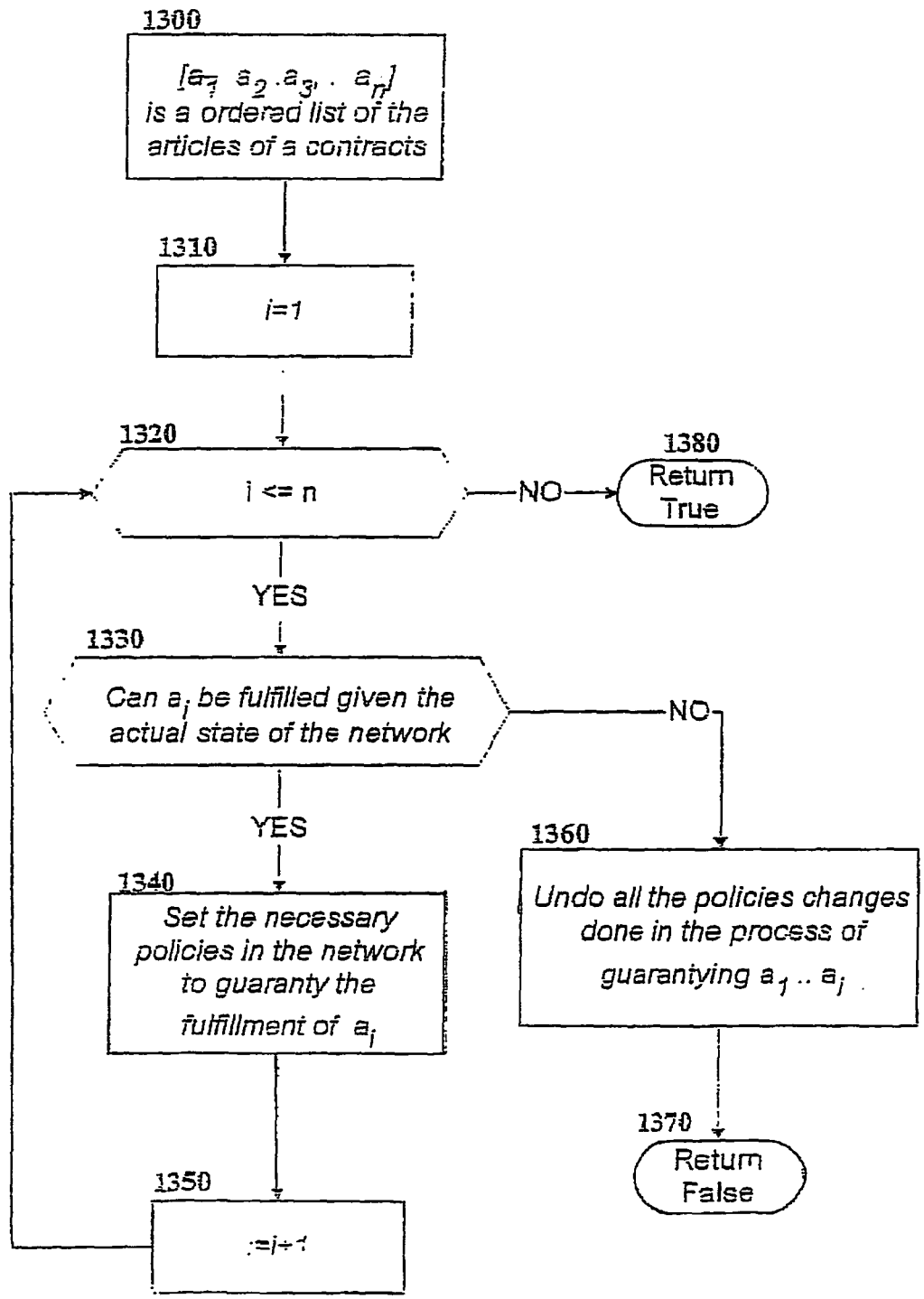
Figure 13: Testing if a contract can be fulfilled

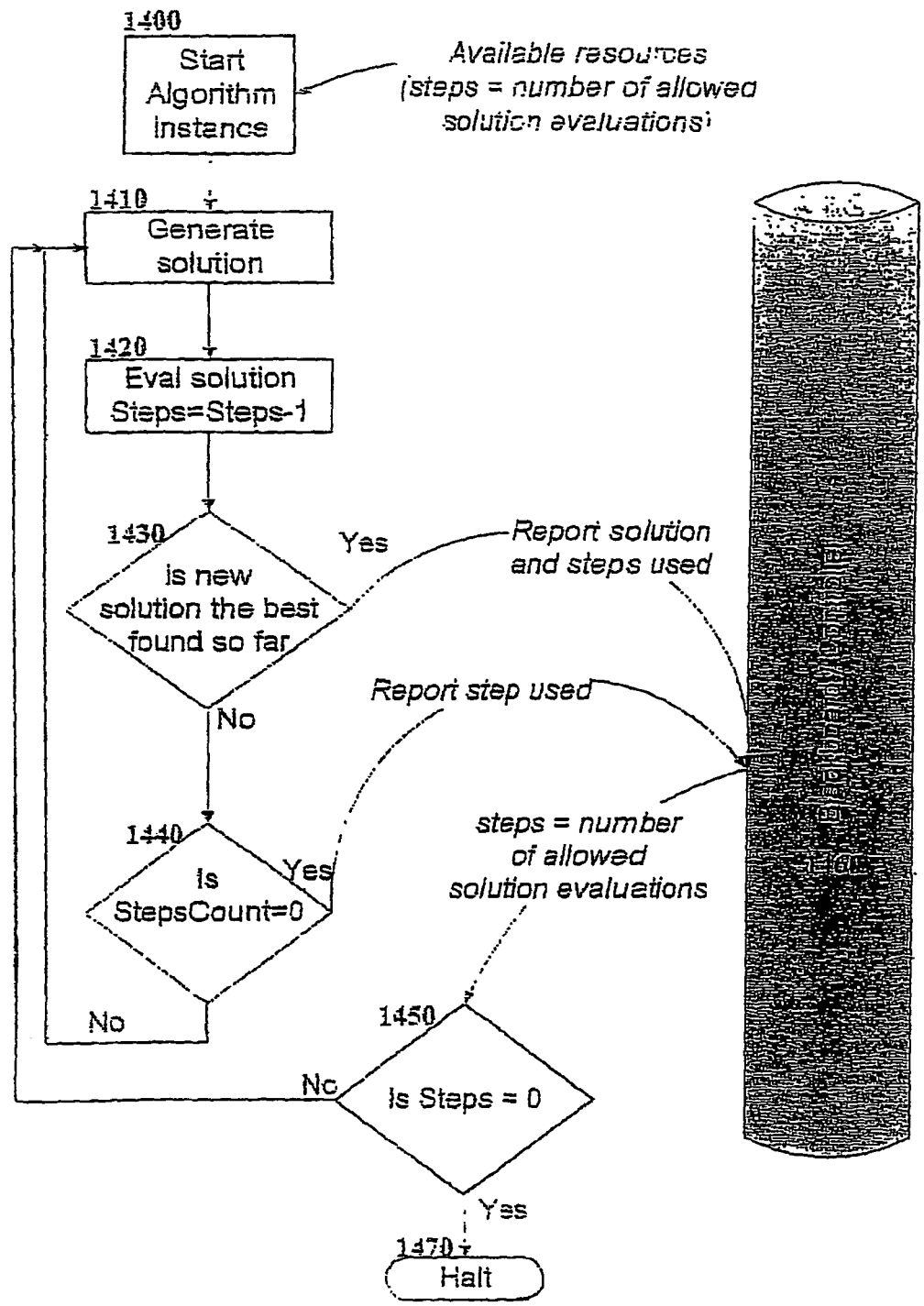
Figure 14 Interaction between the algorithms and the blackboard / controller

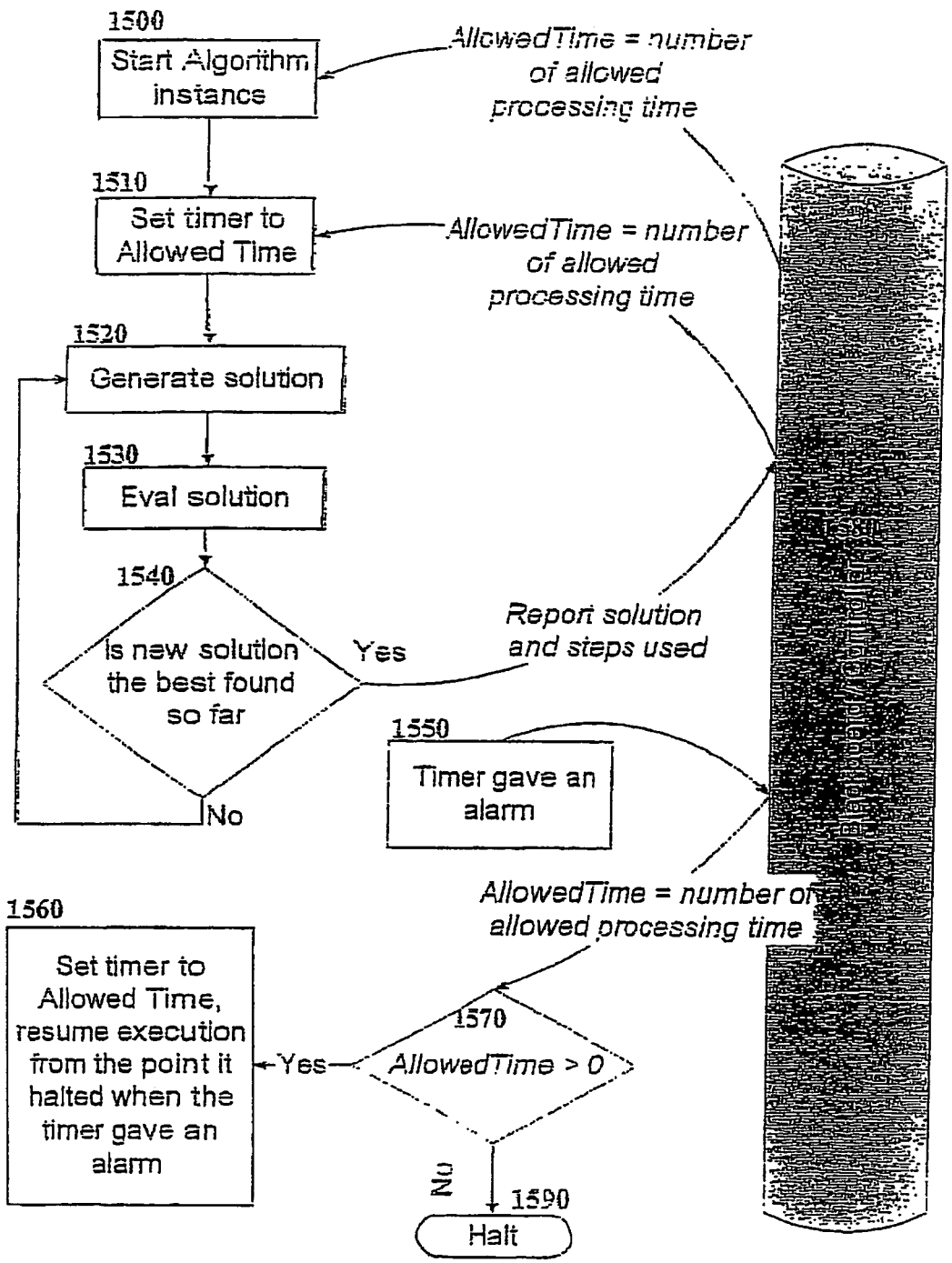
Figure 15: Interaction between the algorithms and the blackboard / controller using CPU time as a resource

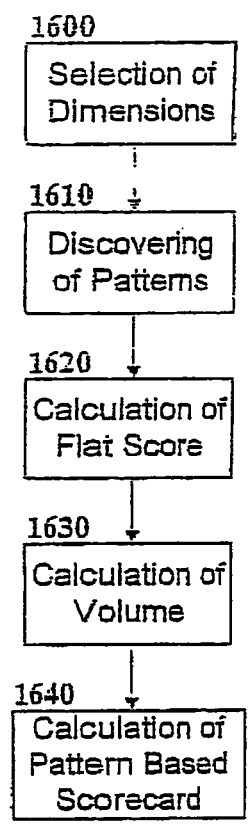
Figure 16: Overview of Pattern Based Score Card

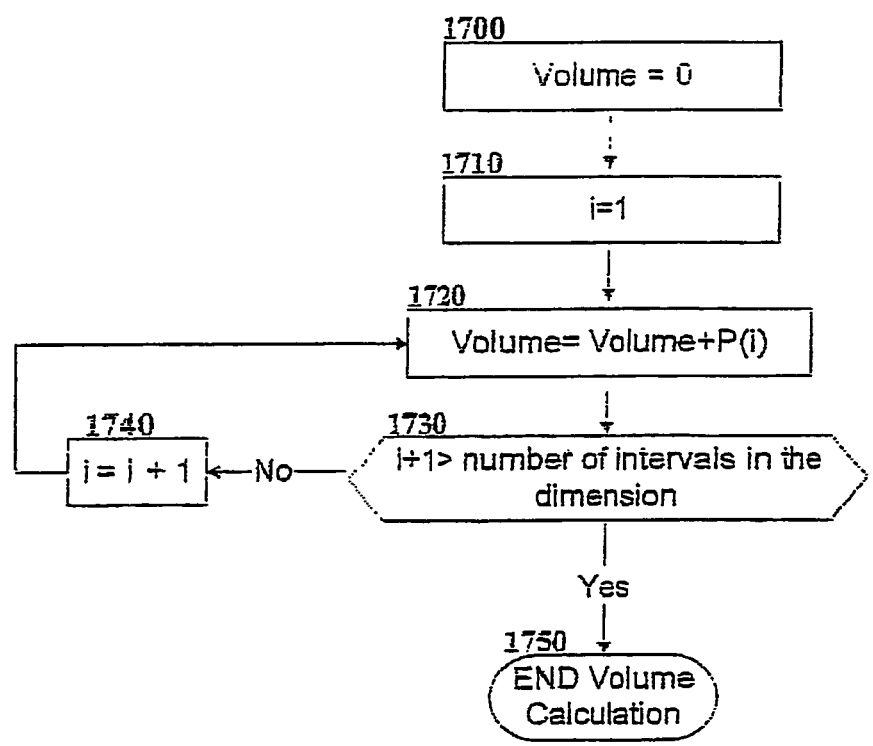
Figure 17: Calculation the *Volume* of a single discrete dimension

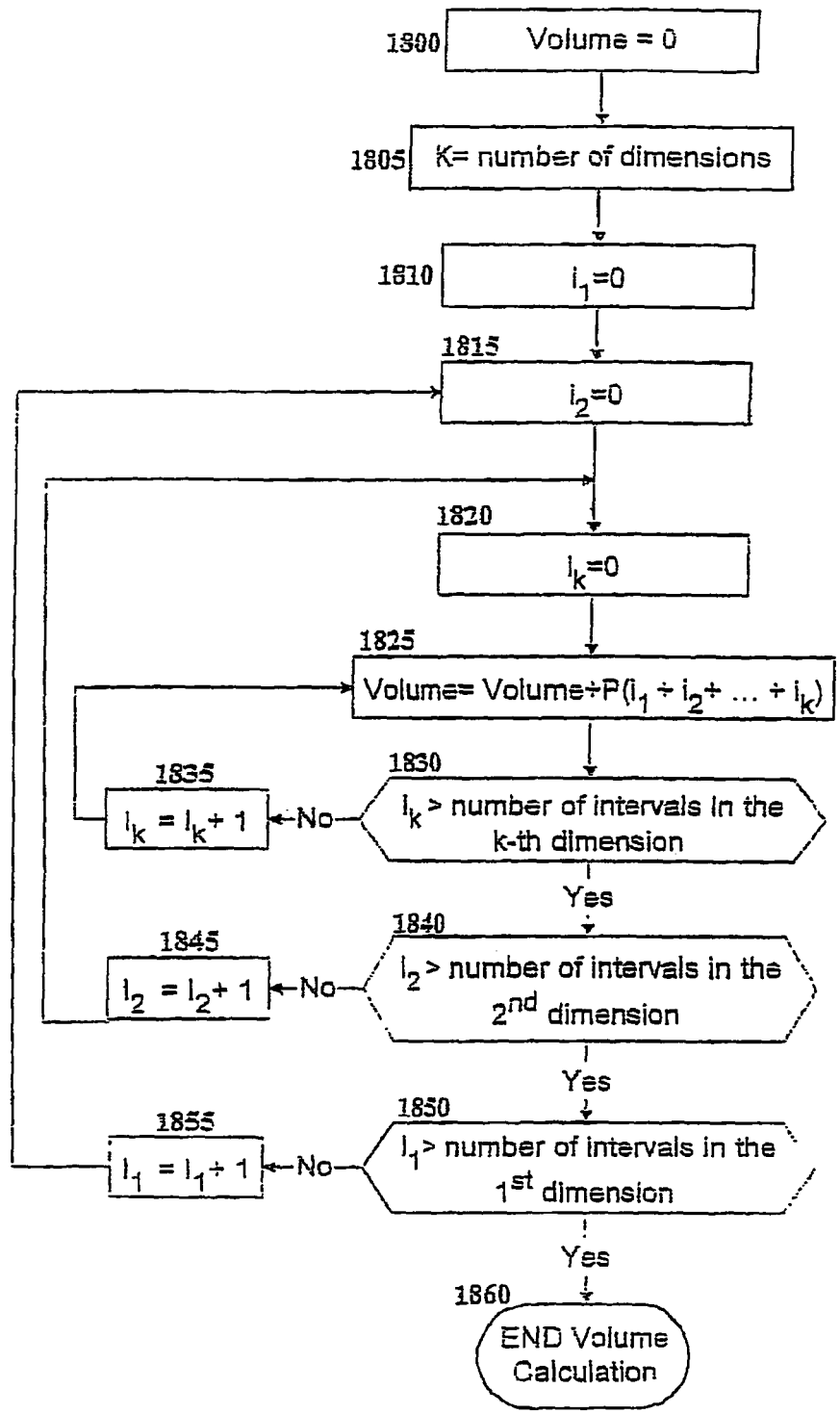
Figure 18: Calculating the cumulative *Volume* of multiple discrete dimensions – mislabeled graph: it is identical to Figure 19 that informs calculation of the Score. Thus we are missing that graph informs calculation of the *Volume*.

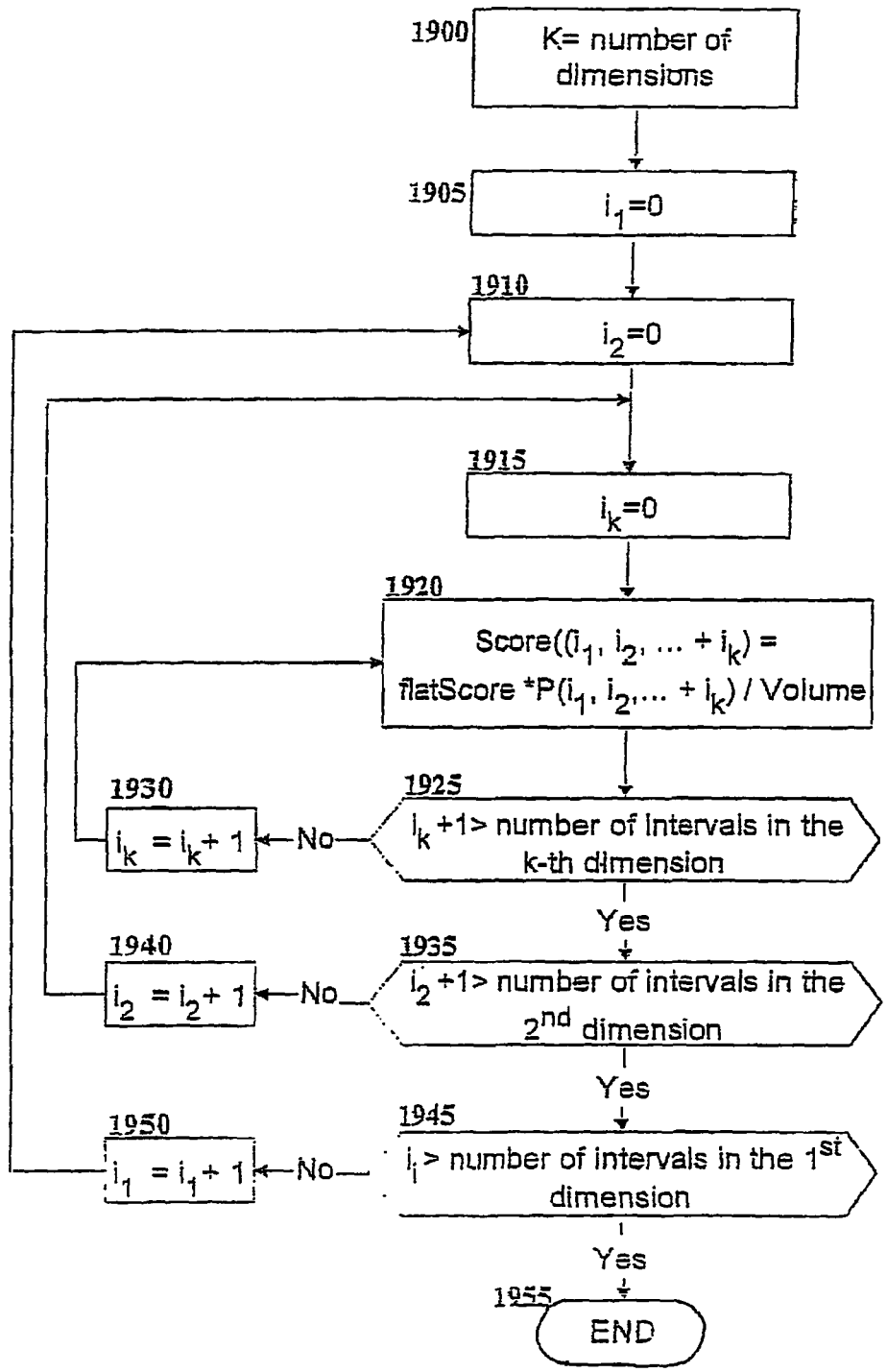
Figure 19 Calculation of the pattern-based scorecard

SYSTEM AND METHOD FOR GENERATING POLICIES FOR A COMMUNICATION NETWORK

FIELD OF THE INVENTION

The present invention relates to the field of communication. More specifically, the present invention relates to the field of adjusting communication networks to improve the operation of the network.

BACKGROUND OF INVENTION

A communication network accessed and used by multiple users or customers may include a huge number of communication and computing devices (e.g. computers, routers, switches, etc. ... ) also referred to as network elements. Each device or network element may support different operations and may follow different policies. At any given moment, large numbers of users may attempt to access the network and may cause vast amounts of communication traffic to traverse the network. In some cases, the amount of data traffic attempting to pass through a network element may exceed the maximum capacity of that network element, and a condition known as a bottleneck may result.

In a network operated by a network operator for access by a group of customers, each customer may have different and complex needs, which needs may be stated in a contract (e.g. Service Level Agreement ("SLA")) with the network operator. An SLA between a customer and a network operator may contain provisions guaranteeing minimum Quality of Service ("QOS") for the given customer and for one or more given applications of the specific customer. QOS is defined, in part, by the ability of a network to carry data traffic that complies with cervix minimal resources and service requirements (e.g., bandwidth, delay, jitter, etc.). A user's QOS may be guaranteed within their SLA with the network operator, and certain SLAs may impose penalties on a network operator if a customer's QOS fans below a threshold level.

Many techniques and methodologies are known for establishing and maintaining QOS levels across a network and within specific network elements or devices. Methods including Weighted Fair Queuing (WFQ), Differentiated Services (Diffserv), Multiprotocol Label Switching (MPLS), Resource Reservation Protocol (RSVP), and others are used to define network policies which attempt to avoid network congestion or bottlenecks. However, when a communication network experiences a surge in traffics or a reduction in the network capacities (e.g., caused by faults), fixed network policies may not be able to compensate for this surge or reduction of capacities, and certain network elements may become congested. Operating at or above capacity along certain data paths, the network may experience bottlenecks and an overall QOS degradation for one or a group of its users.

One method of preventing a user's QOS from falling below a predefined level due to congestion caused by data traffic of a new user is to limit or deny access to the network to new users or new applications. This method involving denial of service requires either that s a new user or new application be denied a request for access, or that a session of a user or application currently using the network be terminated. In this manner, the total number of users or applications using the network may be kept to a number sufficiently low such that the QOS of the majority of existing communication sessions is not degraded. However, refusal of service may translate into lost revenues and in other instances may mean the loss of highly valued customers.

In order to avoid the above-mentioned conditions and commercial results, extensive work has been done to optimize the throughput and QOS compliance of communication networks. Traditionally, however, optimization has emphasized physical network design, selection and topology of network elements (e.g. which components are needed and how to connect them) and routing architecture. Some methods of the prior art use a combination of admission control and dynamic routing to optimize a network.

Some methods of the prior art have attempted to optimize a network with respect to revenues or profits related to the operation of the network. These methods, however, all use simplistic revenue models which do not take into consideration factors such as customer usage over time, customer payment patterns, customer value to the operator, etc. Network optimization methods of the prior art are thus lacking in many respects.

SUMMARY OF THE INVENTION

The present invention is a system and method for adjusting policies in a communication network. The system and method according to the present invention may produce one or a set of policies for network elements on the network such that the network's profitability is improved. The system and method according to the present invention may produce one or a set of policies for network elements on the network such that other parameters in the network are improved (e.g. average QOS for all customers). As part of the present invention, a symbolic network representation (e.g. a node graph) may be formed. The symbolic network representation may be formed by abstracting and pruning an actual representation of the network. As part of the abstracting step, network elements, resources, applications, and users may be clustered based on a predefined set of rules. Pruning may be accomplished by removing those elements of the symbolic representation which would not limit the performance of the overall network under foreseeable conditions.

As a further part of the present invention a symbolic representation of a network to be adjusted may be converted into one or a set of optimization problems. In some embodiments of the present invention, a symbolic representation may be converted into two or more problems or multi-variable functions, where each problem may be semi-independent from the other and may represent a separate portion of the overall network.

A set of different algorithms may be used to estimate possible solutions for each optimization problem. In some embodiments, the algorithms may attempt to estimate a solution comprised of a group of network policies intended to optimize the network with respect profitability. The algorithms used may include Greedy Algorithms, Genetic Algorithms, Simulated Annealing, Taboo Search, Branch and Bound, Integer-Programming, Constraint-Programming. Each of the algorithms mentioned above represents a large family of algorithms and each of the specific algorithms may be used with different parameters.

For different problem instances, algorithm behavior may change radically. One way of reducing the risk of using an inappropriate algorithm while trying to solve new problems is by combining several algorithms and letting them cooperate and compete through a blackboard system. Different algorithms may compete with one another to produce an estimate of the most optimal solution for a given problem. The possible solution for each problem may be in the form of policies to be implements on a portion of the network represented by the particular problem analyzed. In some embodiments of the present invention, network policies may be adjusted automatically by the present invention.

BRIEF DESCRIPTION OF THE DRAWINGS

The subject matter regarded as the invention is particularly pointed out and distinctly claimed in the concluding portion of the specification. The invention, however, both as to or ion and method of operation, together with objects, features, and advantages thereof, may best be understood by reference to the following detailed description when read with the accompanying drawings in which:

FIG. 1 is a flow diagram showing three basic stages of an optimize on method or process according to the present invention;

FIG. 2 is a flow diagram showing the steps of one possible pre-processing stage according to the present invention;

FIG. 3 is a network diagram of an exemplary communication network which may be adjusted or tuned according to a system or method of the present invention;

FIG. 4 is a symbolic network representation of the network diagram in FIG. 3;

FIG. 5 is a flow diagram showing the steps of a process or method by which preliminary pruning may be performed according to the present invention;

FIG. 6 is flow diagram showing further steps of a process or method by which preliminary pruning may be performed according to the present invention;

FIG. 7 is a flow diagram showing the steps of a process or method of formulating a set of semi-independent sub-problems according to the present invention;

FIG. 8 is a flow diagram showing three possible steps of a process or method by which abstraction of a network representation may be performed according to the present invention;

FIG. 9 is a block diagram shoving relationships and interaction between a set of optimization algorithms through a blackboard and under the control of a control unit;

FIG. 10 is a block diagram depicting multiple instance of a the same algorithms running in parallel;

FIG. 11 is flow diagram showing the steps of a process or method by which a list of network user contracts may be evaluated according to the present invention;

FIG. 12 is a flow diagram showing the steps of a post-processing stage according to the present invention;

FIG. 13 is a flow diagram showing the steps of a process or method by which a contract my be tested according to the present invention;

FIG. 14 is a flow diagram showing the steps of a possible algorithm interaction process or method according to the present invention;

FIG. 15 is a flow diagram showing the steps of a possible algorithm interaction process or met hod according to the preset invention where CPU is a shred resource;

FIG. 16 is a flow diagram showing steps of a possible process or method for generating pattern based store cards according to the present invention;

FIG. 17 is a flow diagram showing the steps of a process or method of calculating volume of a single discrete dimension of a pattern based scorecard according to the present invention;

FIG. 18 is a flow diagram showing the steps of one possible process or method of calculating volume of a multiple discrete dimensions of a pattern based scorecard according to the present invention; and FIG. 19 is a flow diagram showing the steps of one possible process or method of calculating a pattern based scorecard according to the present invention.

It will be appreciated that for simplicity and clarity of illustration, elements shown in the Fig.s have not necessarily been drawn to scale. For example, the dimensions of some of the elements may be exaggerated relative to other elements for clarity. Further, where considered appropriate, reference numerals may be repeated among the Fig.s to indicate corresponding or analogous elements.

DETAILED DESCRIPTION

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or preconfigured by a computer program stored in the computer. Such a computer program may be stored in a computer readable storage medium, such as, but is not limited to, any type of disk including floppy disks, optical disks, CD-ROMs magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The present invention is a system and method for adjusting policies in a communication network. The system and method according to the present invention may produce one or a set of policies for network elements on the network such that the networks profitability is improved. The system and method according to the present invention may produce one or a set of policies for network elements on the network such that other parameters in the network are improved (e.g. average QOS for all customers). As part of the present invention, a symbolic network representation (e.g. a node graph) may be formed. The symbolic network representation may be formed by abstracting and pruning an actual representation of the network. As part of the abstracting step, network elements, resources, applications, and users may be clustered based on a predefined set of rules. Pruning may be accomplished by removing those elements of the symbolic representation which would not limit the performance of the overall network under foreseeable conditions.

As a further part of the present invention, a symbolic representation of a network to be adjusted may be converted into one or a set of optimization problems. In some embodiments of the present invention, a symbolic representation may be converted into two or more problems or multi-variable functions, where each problem may be semi-independent from the other and may represent a separate portion of the overall network.

A set of different algorithms may be used to estimate possible solutions for each optimization problem. In some embodiments, the algorithms may attempt to estimate a solution comprised of a group of network policies intended to optimize the network with respect profitability. Although the solutions may not exactly "optimize" the network, they may serve to adjust or tune the network so as to improve the network with respect to profitability. The algorithms used may include Greedy Algorithms, Genetic Algorithms, Simulated Annealing, Taboo Search, Branch and Bound, Integer-Programming, and Constraint-Programming. Each of the algorithms mentioned above represents a large family of algorithms and each of the specific algorithms may be used with different parameters.

For different problem instances, algorithm behavior may change radically. One way of reducing the risk of using an inappropriate algorithm while trying to solve new problems is by combining several algorithms and letting them cooperate and compete through a blackboard system. Different algorithms may compete with one another to produce an estimate of the most optimal solution far a given problem. The possible solution for each problem may be in the form of policies to be implements on a portion of the network represented by the particular problem analyzed. In some embodiments of the present invention, network policies may be adjusted automatically by the present invention.

The present invention may permit network adjustment or tuning with respect to complex realistic inputs that may include economical revenue models, multipart contractual agreements, actual network-specific and contract-specific traffic volume and patterns, billing data, and customer relationship agent ("CRM") data. The present invention may support a rich representation of contracts and SLAs where a contract can consist of multiple subcontracts, each with a set of unique QOS requirements. Penalties and revenues may be related separately to each sub-contract or the entire contract where revenue is obtained only if the full contract, including all its subcontracts is fulfilled. Additionally, the present invention may permit the use of plug-in business rules, which makes it adaptable to various environments without having to change the optimization algorithms. The present invention may also include an abstract network representation that allows using the same algorithms to optimize different types of network, including but not limited to Asynchronous Transfer Mode (ATM) and Internet Protocol (IP) networks.

Unlike existing network optimization tools that rely on network re-engineering (adding components or changing topology) or on changing the routing, the present invention may use different QOS policing techniques to adjust or tune the overall profitability of a network. For example, in a network that uses Diffserv, the present inventing may adjust or tune the network either by changing the Differv definitions or by changing the coloring rules. According to some embodiments of the present invention, near-real time tuning of an entire network is possible, as compared to existing systems that perform either a "batch optimization" of the whole network or a limited optimization, e.g., acceptance control applied only to new communications entering the network.

Furthermore, the present invention may use an abstraction and clustering layer that enables an "optimization process" (the term "optimization" as used in this specification may also include "adjusting or tuning such take a particular parameter or characteristic of a network is improved") to focus on the most relevant elements of a network, thus allowing near-real time optimization even for very large networks. Optimization may be performed for a specific interval of time during which contractual provisions, SLAs and network status may change.

A component of network profitability optimization may be the ability to rank network users based on their value to the network operator. For example, two customers may have similar contracts and SLAs, yet the first customer may pay on time, while the other has not paid in months. Moreover, the first customer may use only a fraction of the bandwidth assured by his SLA, while the other may over-utilizes his allowance of bandwidth. Thus, the first customer's contract may be of more value to the network owner than that of the second customer. Yet a simple look at each contact's revenue figure may not reveal this distinction.

In order to highlight the difference in value of the two customers, a traditional scorecard may be used. But often, just assigning a score to a customer is not enough. For example, even of the two customers have the same score, and both bought contracts that give them the same amount of bandwidth, the first customer may do most of his important transactions in the morning, while the second customer may do his most important transactions in the evening. Obviously, assigning a simple score per customer is not enough to determine which customer is more important at a particular time. It is essential to use a score profile that reflects change in customer's score across time. Such profile can be best described as the customer's score graph.

Therefore, as part of the present invention, a traditional scorecard model may be extended into a pattern-based scorecard that allows for estimation of the value of each contract at a specific time or over a specific interval of time. A two-dimensional patter-based graph may be used, in which one dimension is the time and the other is a customer's score. A major benefit of using a patter-based scorecard is that it enables optimization decisions to be taken with respect to the whole graph instead of just a single score. It may provide the flexibility to perform optimization either for a single point or for an entire interval on the graph. The method of utilizing a pattern-based scorecard is applicable to many areas, and extends to the use of multidimensional pattern-based graphs.

Profit Optimization Defined

The goal of the network profit optimization is to select a set of contracts that can be fulfilled according to the network and business constraints, so that the sum of the value to the operator of all the fulfilled contracts is maximized. The optimization identifies the set of contracts that should be fulfilled and a set of operations (e.g. set of policies which should be set) that should be performed in the network in order to fulfill the contracts.

In order to fulfill the contracts, the present invention may use different policy mechanisms found in networks, including but not limited to: weighted fair queuing (WFQ), Diffserv, MPLS and RSVP. The operations used by the present invention may not need to include physical changes to the network (e.g., adding lines or routers), directly changing routing tables (routing tables may be changed indirectly as result of the changes in the policies, or the usage of RSVP).

The present invention may have an internal representation of the different technologies, and the policies applicable to each of them. An optimizer application can be adapted to work with more technologies by entering their descriptions. For example, an optimization application according to the present invention may be operate with a variety of network technologies and protocols, including but not limited to wire, wireless, IP and ATM networks.

Network Optimization Inputs

The inputs to a network optimizer according to the present invention may comprise three basic groups of data elements: (1) data that provides network description; (2) data that describes network customers and business arrangements in place with each customer; and (3) data that defines optimization criteria to be satisfied by the optimization process.

Network description data may comprise information such as inventory, topology and condition of network elements. For example, the information may contain a listing of all network elements, their locations, corresponding network ports and connections with their respective bandwidth capacities. Other inputs may include network routing and malfunctions data, information on supported policies (e.g., if Diffserv is supported), applied policies (e.g., if Diffserv is in use with network elements), as well as limits that could be placed on policies (e.g., if a network elements can not support more than three policies). The optimizer can also work with partial network data (e.g., without muting information).

Data describing network customers may include their historical usage patterns, pattern-based scorecards, actual current usage, billing data, and both business and network practices. It may also include contract-specific financial data, operational and legal information. For example, a contact article may require a network operator to provide service to a specific customer over a certain time interval with certain QOS specifications. Since a typical contract is a set of many individual contract articles, the overall value derived from the entire contract will be based on the performance against all the articles in the contract. This value will aggregate factors including, but not limited to: (1) face value of the entire contract, (2) cost associated with fulfilling articles of the contract, and (3) penalties associated with violating QOS or other contract provisions contained in various contract articles. Additional customer information may specify level of importance assigned by the network operator to each customer contract. This data may be represented with a pattern-based scorecard as will be further describer below.

The optimization criteria may include such requirements as performing optimization (e.g. specifying network policies) for a specific time interval, where such an interval can be comprised of several sub-intervals, each with unique service requirements and network status. For example, an interval from 8 AM to 11 AM may include three sub-intervals: 8 AM to 9 AM, 9 AM to 10 AM and 10 AM to 11 AM. A contact may specify that a customer should receive service from 8 AM to 10 AM and no service from 10 AM to 11 AM, because of scheduled router maintenance. The selection of sub-intervals thus depends on business practices of the network's owner and may constitute a critical input that enables the present invention to perform a set of actions at the beginning of the specified interval that will yield a solution considering the changes in the demands and resources across multiple sub-intervals. It is possible to have different policies set per each sub-interval, which may require solutions to several optimization problems, one solution per each sub-interval.

Turning now to FIG. 1, there is shown a block diagram indicating three stages of a method of adjusting a network according to present invention. The three steps are pre-processing 100, optimization 110, and post-processing 120. The output 130 of the method is one or a set of policies to be implemented an various network elements.

Pre-Processing

Turning now to FIG. 2, there is shown a block diagram depicting an example of a pre-processing stage according to the present invention. The pre-processing stage according to the example of FIG. 2 may include five steps: (1) Representation Transformation 200, (2) Preliminary Pruning 210, (3) Abstraction 220, (4) Division into Semi-Independent Sub-problems 230, and (5) Pruning 240.

Representation Transformation

During the process of representation transformation, a description of the network, which may either be provided in a network manager application or may be derived using a pinging and mapping routine or by other methods, is translated into a symbolic network representation, such as a directed graph representation, where network elements and their connections and ports may be represented by nodes. For example, turning now to FIG. 3, we can see an example of a simple network representation where the information in the parentheses represents the bandwidth capacities with the first number informing the upstream limit, and the second the downstream limit. The exemplary network of FIG. 3 includes nodes A, C, E and J. Node A includes a single port $A_1$ whose capacity is 45 units of outgoing traffic and 60 units of incoming traffic. Edge B connects nodes A and C. Edge B has a capacity of 100 in one direction and a capacity of 40 in the opposite direction. Each of ports $C_1$ and $C_2$ have traffic capacities of 300 incoming and 30 outgoing. Edge D connects nodes C and E. Edge D has a capacity of 300 in one direction and a capacity of 150 in the opposite direction. Node E has a traffic capacity of 999 units incoming and 999 units outgoing. Node 3 has 3 ports: $E_1$, $E_2$, and $E_3$. Node J has a traffic capacity of 400 units incoming and 400 units outgoing. Edge K connects nodes J and E via ports $E_L$ of node E and $J_L$ of node T. Edge K has a capacity of 300 in one direction and a capacity of 300 in the opposite direction. Edge F connects nodes J and E via port $E_3$ of node E and $J_1$ of node J. Edge F has a capacity of 50 in one direction and a capacity of 50 in the opposite direction All the connections are bi-lateral. The numbers in the network elements' parentheses apply to all the ports for the network elements.

Turning now to FIG. 4, there is shown an example of a symbolic network representation which is a directed graph representation of the network of FIG. 3. A pair of nodes represents bi-directional connections or ports connected to bi-directional connections. Each node that represents a port (or half of a bi-directional port) is connected by a directed edge to the node that represents the connection (or the corresponding half of a bi-directional connection). The direction of the edge corresponds to the direction in which the connection was oriented in the original network. Each network elements is represented by a node, which are linked by edges to all the nodes that represent that network elements ports. All the relevant attributes of network elements, ports, and connections are associated with the correspondent nodes. For example, if a give connection has a bandwidth limit the same bandwidth limit will apply to the nodes that represent it.

Preliminary Pruning

During one example of a preliminary pruning stage according to the present invention, elements that do not constrain contact fulfillment may be removed from the symbolic network representation. For example, a port that possesses more bandwidth capacity than required to satisfy any foreseeable demands will be pruned.

Network requirements that correspond to the level of performance desired within the time interval for which the optimization is performed may be estimated as part of the preliminary pruning process. The requirements are calculated per each sub-interval within the specified interval. Information inputs used for estimating the expected network requirements, including minimum QOS levels for clients, may include data from forecasting systems, historical data, usage patterns, and data from ordering and provisioning systems.

As a further sub-step of a preliminary pruning process, calculated or estimated requirements may be mapped to the elements of the symbolic network representation (e.g. directed graph representation). For each expected network requirement, the present invention may calculate its probability to demand the use of one or more network elements, ports, and connections. The probability calculation may be derived from some or all the following information sources: (1) routing tables, (2) routing algorithms, (3) historical data, (4) network management systems network status (e.g., malfunctioning elements), provisioning systems. The calculation may be performed for each criterion that is used as a constraint in the optimization. Such criteria may include: (1) bandwidth requirements. (2) delay, (3) jitter and (4) packet drop rates. For example, for the bandwidth criterion, if the bandwidth requirement of a certain request is k, and the probability of that bandwidth resource being requested is p, then the expected resource consumption is k*p*t, where t is a factor, that is used to account for over or under provisioning. t>1 will result in bandwidth over-provisioning and 0<t<1 will results in under-provisioning. Thus, t can be interpreted as a safety/risk factor. The probability calculation method can be adapted for any similar criterion.

After performing the calculations or estimations relating to all the possible network requirements, a verification of each node's resources may be performed. A check may be performed to assess whether each element's resources are sufficient to satisfy each element's probable requirements. FIG. 5 is a flow diagram depicting the flow of an example of a process by which such a check may be performed. The process of FIG. 5 begins with the set S, an empty solution set 500. Step 510 selects the first sub-interval for examination. Step 520 performs requirements estimation for the selected sub-interval. Step 530 maps calculated requirements to the graphical representation of the network. Step 540 identifies nodes that lack resources (i.e. G, the set of problematic nodes in the selected sub-interval given the mapping and the demands) and step 550 adds such nodes to the collection intended to identify all the "problematic" nodes. If the current sub-interval is not the last one to be analyzed, steps 570 and 560 iterate the process to perform steps 520 through 560 for another sub-interval. In case there are no more sub-intervals to analyze, the process may advance to step 580 where "non-problematic" nodes are pruned or removed from the symbolic network representation.

An example of one possible method for performing the actual pruning is depicted in FIG. 6. Each node whose resources are sufficient to satisfy any foreseeable requirements are removed from the network representation or graph and all the edges that connected that node to other nodes are removed form the network graph. Specifically, step 600 defines N as a set of all the nodes representing network elements and ports in the network. Step 610 defines E as a set of all the edges on the graph. Step 620 defines NewN as a set of all the nodes that are problematic in at least one sub-interval (NewN is equal to S found in FIG. 5). Step 630 defines NewE as a set that is initially empty and represents the universe of edges that belong to the pruned Graph. Step 680 examines contents of E and, if E is not empty, iterates the process to step 640 where the process selects an edge e form the set E. Step 650 performs negative process iteration by removing e from E. Step 660 checks if the two nodes in set N that are connected by e, also belong to set NewN. If the outcome of this step is positive, step 670 of the process adds e to the set NewE. Next step, 680, check if there are no more connections e left in the set E to be analyzed by the process. Positive outcome brings the process to its final step 690 where new directed graph representation of the network is defined on the basis of sets NewN and NewE and where every node is resource-deficient with respect to at least one criterion in at least one sub-interval.

Abstraction

The abstraction of the symbolic representation of the network and thus the optimization problem to be solved may be achieved by generating clusters of similar customers, similar nodes, similar services, similar contracts, and referring to each such cluster as a single representative entity. The clustering can be accomplished according to specific business rules defined by the network operator. For example, an operator may define that all home users are similar, even if in reality their usage pattern differs greatly, and that all the banks should be treated individually, despite their degree of similarity. The quality of the possible optimization may increases with increased granularity of clustering, which in turn may increase the amount of computational resources required by the present invention. FIG. 8 describes an abstraction overview, where similar clients 800, similar services 810, and similar nodes 820 are clusters.

Clustering may be accomplished with a process that may use a standard clustering algorithm. Existing algorithms can be used to execute any of the several alternative methods. An example of one such method may define the parameters of the similarity criteria, which in turn may define the size and granularity of the clusters. For example, assuming that the only criterion is the average required bandwidth, it is possible to classify two clients as belonging to the same cluster if their average bandwidth requirement divided by 10 is equal. This method should result in an arbitrary number of clusters.

Another example of clustering may pre-define the desired size an granularity of the clusters, which in turn defines the similarity parameters. For example, assuming that the only criterion is the average required bandwidth, in order to get exactly 4 clusters, it is possible to obtain a number n such that will yield exactly 4 clusters if two clients will belong to the same cluster if their average required bandwidth divided by n is substantially equal.

A first step in an abstraction process which may be used with the present invention may cluster network nodes by measuring their similarity based upon criteria that may include such inputs as: (1) network topology; (2) node-specific information about customer and service usage patterns; and (3) pre-defined classification and custom rules specified by the network operator.

Next, the process may cluster services by measuring their similarity based upon criteria that may include such inputs as: (1) service location on the network; (2) pre-defined service classification (e.g. Video vs. E-mail); (3) service usage patterns including pattern-based scorecards; (4) service-specific QOS requirements (e.g. VoIP is sensitive to jittering, while Video Steaming with buffers is not); (5) customer-specific information (e.g. home users vs. business users); (6) historical data; and (7) custom rules specified by the network operator.

Service clustering may also use the result of node clustering. For example, if two different services use two different points of presence (POPs) represented by two different nodes, and these nodes were placed into the same cluster, then in abstraction, the two services may be considered to use the same POP.

During an abstraction step, customers may be clustered by measuring their similarity based upon criteria that may include such inputs as: (1) geographical location; (2) access point classification (e.g., the POP); (3) access method (e.g. Asymmetric Digital Subscriber Line (ADSL), Integrated Services Digital Network (ISDN), etc.); (4) customer usage patterns including pattern-based scorecard; (5) customer classification (e.g. business users vs. home users); (6) contract and SLA information; (7) historical and CRM data; and (8) custom rules specified by the network operator. Customer clustering may also use the result of node clustering. For example, if two different customers use two different POPs represented by two different nodes, and these nodes were placed into the same cluster, then in abstraction, the two services may be considered as using the same POP. In a similar manner, customer clustering may also utilize the result of service clustering.

The clustering process is repeated until the reduction in number of clusters obtained by repeating the process is less than a pre-defined limit. In the repetition, the similarity fiction uses clusters found in the previous iterations. The result of the abstraction stage is a representation of the network that has fewer nodes, services and clients. For example, a single new user may be used to represent all the home users.

Division into Independent and Semi-Independent Sub-Problems

Once a symbolic network representation, and the optimization problem it defines, is abstracted according to the present invention, the symbolic representation and the optimization problem it represents may be divided into independent and semi-independent sub-problems. Two sub-problems are considered independent if they do not contain common network elements and if none of the same customers or services use any of the network elements that belong to the two different independent sub-problems. The concept of Distance is key to understanding what constitutes an independent sub-problem. Distance is a function which defines the distance between a given network node and a sub-problem with given customers and services. The distance for two independent sub-problems, P1 and P2, is equal to infinity if, for each element e1 in P1, the distance between e1 and P2 is equal to infinity and if, for each element e2 in P2, the distance between e2 and P1 is equal to infinity. Similarly, two sub-problems can be considered semi-independent, given a certain distance function D and a threshold T, if for each element e1 in P1, the distance between e1 and P2 is greater than or equal to T and if, for each element e2 in P2, the distance between e2 and P1 is greater than or equal to T.

Each sub-problem for a particular portion of the network is party defined or derived from a corresponding portion of the symbolic representation of the network. The division of the optimization problem into independent sub-problems makes it easier to obtain a solution. While many problems do not include fully independent sub-problems, disaggregating the problem into the semi-independent problems may result in a set of problems that can be optimized more easily than the full problem. Even though solving these problems may not provide the "optimal solution" to the full problem, it provides an approximation of an optimal solution, if one exists.

The network optimization method does not place restrictions on the distance function and the threshold. Several functions are built into the system and other functions may be easily integrated using technologies such as, for example, COM or Dynamic Link Libraries (DLLs).

Turning to FIG. 7, there is shown a detailed flow diagram of the step of one possible method by which an optimization problem (e.g. derived from a symbolic network representation) according to the present invention may be divided into several semi-independent sub-problems. First in step 700, N is defined as a set of nodes in the network representation. Next, in step 705, C is defined as a set of customers in the network representations. Following that, in step 710, S is defined as a set of services in the network representation. Then, in step 715, T is defined as the threshold criteria used to determine problem semi-independence. Next, in step 720 a set of possible sub-problems P1 . . . Pn is defined. In the step 725, a sub-problem counter i to zero is set. Next, step 730 checks if N contains any un-analyzed nodes. Step 745 sub-problem counter is iterated by one, which ensures that for each sub-problem Pi the process will loop through all the nodes contained in N. As part of step 735, a network element is selected and entered into the current semi-independent sub-problem being analyzed while the process performs a negative iteration that reflects the fact that there is one less node in the set N to be analyzed in the next process cycle. In the step 740, the process defines a new set K, which contains the current universe of un-analyzed network nodes. Further, step 750 checks if K is equal to zero. Positive outcome indicates that all network nodes have been analyzed for the current sub-problem i, which forces the process to return step 730, where it is advanced to the next sub-problem with counter i being iterated by 1. Negative outcome of check 750 implies that there remain nodes that have not yet been analyzed in conjunction with the current sub-problem. Next, the process moves on to step 755, where node g is picked out from the set K, after which K is left with one fewer node to be analyzed in the next iteration. After this, in the step 760, the distance function is calculated for the current node g. The same step, 760, checks that the value of the distance function does not exceed pre-determined threshold T. A negative outcome means that the condition of semi-independence has not been satisfied for the node g and the process is advanced to step 750. A positive outcome means that g should be added to the current semi-independent problem and removed 765 from the set N. Following this step, the process returns to 740. It is evident that the process depicted in FIG. 7 continues until all the network elements in the original problem are associated with a sub-problem.

Pruning

After the clustering and the division into semi-independent sub-problems, the present invention may attempt again to prune from the network representation network elements that do not constrain contract fulfillment. Even though many non-constraining network elements may have been pruned in the initial pruning stage, the abstraction and problem disaggregation into sub-independent problems make it possible to identify more such elements. Additional pruning is performed per each sub-problem using the same method that was employed in the preliminary pruning.

Optimization

Following the initial pruning, abstraction, problem disaggregation and another round of pruning, optimization may be attempted separately on each of the semi-independent sub-problems created in the pre-processing stage. The optimization may be performed or attempted by using various algorithms that run simultaneously and use a blackboard-based architecture to cooperate and compete.

Turning now to FIG. 9, there is presented an example of a basic blackboard architecture where three algorithms, in this example a (1) Generic Algorithm 910, a (2) Greedy Algorithm 1020 and (3) a Simulated Annealing algorithm 930 "share" a common blackboard 940 that contains a common representation of the problem and of the solutions. The algorithms may exchange their selected solutions 1080 trough the blackboard. Additionally, algorithms may post to the blackboard their operational statistics 1090. An example of such statistic is the number of evaluations completed by an algorithm by a certain point in time.

A controller or control unit 1000 may be responsible for managing the optimization process. The control unit 1000 may calculate control parameters that may include the following (1) the absolute quality of the solutions found by one instance, (2) the relative quality of the solutions found by one instance compared to solutions found by other instances, (3) the absolute advance rate of one instance (e.g. the amount of resources the instance used in order to improve its last solution) and (4) the relative advance rate of one instance compared to other instances (e.g. the amount of resources the instance used in order to improve its last solution compared to other instances).

Controller 1000 may use parameters it calculates to estimate the potential of the different algorithms to find improved solutions. According to its estimations, the controller 1000 may decide on the amount of computing resources to be allocated to the different instances of the algorithms. The controller 1000 may increase or decrease the resources assigned to an instance of an algorithm, halt an instance of an algorithm, create a new instance of an algorithm from a certain family and supply the values of the parameters to be used in the new instance. The use of competing and cooperating algorithms on a blackboard to solve optimization problems are well known. Any processing known today or to be derived in the future is applicable to the present invention. In addition to the algorithm depicted in FIG. 9, the algorithms known as "Taboo Search" and "Branch and Bound" may be used. Any family of optimization algorithms known today to be devised in the future is applicable to the present invention.

Turning now to FIG. 10, there is shown a diagram depicting more than one algorithm of each type being used in as part of an optimization according to the present invention. Either with different paramours, or with the same parameters, multiple instances of the same algorithm may be used. The latter option is valuable due to the stochastic nature of some of the algorithms such as, for example, Simulated Annealing. Specifically, FIG. 10 shows how Three Genetic Algorithms (1010, 1040, 1060), three Simulated Annealing Algorithms (1030, 1050, 1070) and one Greedy Algorithm may be used as part of an optimization process according to the present invention. Also shown in FIG. 10 are elements 1000, 1020, 1080 and 1090. One possible interaction flow of various algorithms and the controller/blackboard 1460 according to the present invention is depicted in FIG. 14. In the first step, the controller 1460 starts a new instance of an algorithm and passes to it an allowance of resources. The allowance defines the number of solutions that the algorithm is allowed to evaluate. This value is expressed by the variable steps used in the step 1420. Next, in the step 1400, the algorithm instance starts to run. In the step 1410, the instance generates a solution. In the following step, 1420, the solution is evaluated, and the number of allowed solution steps is decreased by one. Next, in the step 1430, the controller checks if the new solution is the best found so far by this instance of the algorithm. If so, the algorithm reports the solution and steps used to obtain it to the controller, otherwise step 1440 verifies if the instance has the resources to perform additional evaluations. If the outcome is positive, the instance returns to step 1410 to generate another solution, otherwise the instance reports the solution and steps used to obtain it to the controller and indicates that it is out of resources (e.g. it has exhausted the number of evaluations initially granted to it). Next, the controller may use information stored in the blackboard to determine the amount of resources to assign to the algorithm and returns this allowance to the algorithm. Also shown in FIG. 14 are steps 1450 and 1470. In a similar way, the allowance of resources can take the form of CPU time allocated to an algorithm. FIG. 15 illustrates such a scenario, as shown in steps 1500, 1510, 1520, 1530, 1540, 1550, 1560, 1570 and 1590.

Contract Value Evaluation

Now turning to FIG. 11, we can examine the process by which one possible optimization method according to the present invention may calculate the value of an ordered list of contracts C. Fist, in the step 1100, the process defines a list of contracts. Next, in the step 1110, the process sets value variable to zero and the process counter i to 1. Further, in the step 1120, the process checks whether there are still contracts that have not been evaluated. If no, then all the contracts have been analyzed and the process halts on step 1170. If yes, then the next step, 1130, will test if the current contract Ci can be fulfilled, and if so, the next step, 1140, will guaranty that contract by setting the appropriate policies. Further, step 1150 will calculate the value of the current contract and increment it to the running sum that represent total value of all contracts. Step 1160 will increment process counter by 1 thus advancing the process to the next cycle.

The evaluation process described above, implies that fulfilling a contract requires fulfilling all of its articles, where the criteria for fulfilling a contact in respect to each article depends on the QOS requirements and a set of rules that define the applicable network and business constraints. The algorithms may not calculate values associated with the solution they provide. Instead, they may use an evaluator that assesses the solutions by, among other things, examining if the performance criteria applied to the contracts and subcontracts is satisfied.

An evaluator according to the present invention may not contain rigid business and network constraints, but rather constraint templates that can be used to create constraint instances. The process can seamlessly integrate built-in constraint templates and rule constraints provided as COM objects or as DLLs, so that a single template may be used to define several constraints by invoking the rule templates with different parameters. For example, a rule template may limit the total assigned bandwidth to a pre-defined fraction of the available bandwidth in certain connections, place a limit on the number of policies in a given network port, or limit the number of data flows in a given network element.

Each algorithm may use its own copy of the evaluator, or even several copies of it, which permits evaluating multiple solutions in parallel. This may be especially be useful for genetic algorithms. At the same time, several algorithms may use a single evaluator. All the copies of an evaluator in a single optimization process may use the same constraints, more specifically, the same rule templates and parameters.

FIG. 13 illustrates the flow of a process by which a list of contracts can be that evaluates whether as to whether they may be fulfilled. Here, the first step 1300 initiates the process by specifying a set of n articles which may constitute a single contract to be analyzed. Step 1310 initializes the process counter. Step 1320, which is performed for all iterations in the process cycle, checks if there is another un-analyzed contract that requires processing. A negative outcome results in the process being halted and returning a "TRUE" value in step 1380. Otherwise, step 1330 checks if the current contract article can be performed given the network conditions. A negative outcome indicates that the entire contract cannot be performed and step 1360 of the process will cancel all the policies and changes relating to that particular contact that might have been guaranteed in the course of the process. Next, the process is halted in the step 1370 retuning a "FALSE" value. If the outcome of step 1330 is positive, the process moves to step 1340 where it sets the policies required to guarantee fulfillment of the current contract. Step 1350 iterates the process to the next cycle, in which another contact is evaluated. The steps 1320-1370 are repeated until the condition in step 1320 indicates that all articles of the contract have been analyzed and could be fulfilled and have been guaranteed.

Post-Processing

FIG. 12 describes a possible post-processing stage according to the present invention. Step 1200 initiates the process by defining a set of k contracts selected for fulfillment by the optimization process. Each of the contracts in this set can represent multiple contracts that were clustered together in the pre-processing stage. Next, step 1210 may initialize the process counter i. Further, step 1220 checks if the process counter exceeds k, which would indicate absence of un-analyzed contact. If no, the process may be advanced to step 1230 that selects the n original contracts making up the current contact. Next, in the step 1240, the process sets j as a counter that defines a loop designed to process all the original contracts. Step 1250 checks if all the original contracts have gone through the loop. If no, step 1260 will define how to fulfill the current original contract based on the results of the optimization stage. Specifically, it will be determined which policies needed to be set. Network and business specific rules may be ignored at this juncture. Step 1270 may iterate the loop to evaluate the next original contract. This process is repeated until the check performed in step 1250 will determine that all original contacts have been analyzed and will advance the process to step 1280, which may iterate it to the next cycle that will select another aggregated contract. This process may be repeated for every aggregated contract until the check performed in step 1220 determines that all the contracts have been analyzed, which may bring the process to step 1290. In this step, for each network element and port, the process will consider all the policies defined in the proceeding steps. If these policies satisfy such limitations of network element's and parts as the umber of flows and policies permitted, then the process may recommend applying the associated policies. If the policies do not satisfy existing limitations, the process may use network masks to group them together in order to obtain a reduced number of flows and policies which to would satisfy network element and port constraints. Thus network policies are compiled.

Pattern-Based Scorecard

Any method known today or to be developed in the future for compiling a score card or score graph may be applicable to the present invention, FIG. 16 depicts one method according to the present invention to calculate the pattern based scorecard or score graph. Calculating a pattern-based scorecard according to some embodiments of the present invention may include five steps. As seen in FIG. 16, Preliminary step 1600 may perform selection of problem dimensions, for example, by specifying a time interval defined by specific days of the week and hours of the day. The dimension may be continuous or discrete. Next step 1610 may perform discovery of the patterns across specified dimensions. For example, if the dimension is a time interval defined as a specific hour of a specific day, and the pattern is usage volume, then for each minute in the specified hour, the process may calculate the amount of service used by the entity whose score is being calculated. The pattern may reflect such characteristics as service usage, revenue, expenses, etc.

Further, step 1620 may calculate the flat (regular) score by employing various methods that may include mathematical calculations, rule-based systems, expert systems, and neural networks. The result of the calculations may be a single score given to the entity. Next, step 1630 may calculate the volume. As FIG. 17 illustrates, as seen in steps 1700, 1710, 1720, 1730, 1740, and 1750 of FIG. 17, for a single discrete dimension, the volume may be the sum of all the points in the pattern. For a single continuous dimension, the volume may be the integral of the pattern.

Finally, step 1640 may calculate the pattern-based scorecard, where for a single discrete dimension, the pattern-based scorecard may be a discrete graph in which each point is the flat-score multiplied by the value of the pattern in that point and divided by the volume. For a single continuous dimension, the pattern-based scorecard may be a continuous graph in which each point is a flat score multiplied by the value of the pattern in that point and divided by the volume.

When more than one dimension is used, there may be three methods for calculating the volume. The first method may set all the dimensions on the same level and calculate an integral or sum of all the points in all the dimensions at the same time. FIG. 18 describes a process of calculating the volume using the first method when all the involved dimensions are discrete. Step 1800 sets the Volume to 0. Next, step 1810 sets K to the number of dimensions. Step 1810, initializes $i_1$, which sets the number of processed intervals in the first dimension to 0. Step 1815 initializes $i_2$, which sets the number of processed intervals in the second dimension to 0. This is done for all the K dimensions, and step 1820, does it for the $k^{th}$ dimension. Each of the Steps 1810, 1815, and 1820 is the starting point for an iterative loop over the correspondent dimension. Step 1825 adds to the volume the volume at the point $P(i_1, i_2, \ldots i_k)$. Step 1830 checks if all the points in the loop for the $k^{th}$ dimension were processed, if not, $i_k$ is incremented in step 1835, and the loop continues to step 1825 to process the next interval in the $k^{th}$ dimension. Similar steps are done for all the dimensions, and step 1840 checks if the all the points in the loop for the second dimension were processed. If not, $i_2$ is incremented in step 1845, and the loop continues to step 1820 to process the next interval in the second dimension. Step 1850 checks if the all the points in the loop for the first dimension were processed, and if not, i is incremented in step 1855, and the loop continues to step 1815 to process the next interval in the first dimension. When step 1860 is reached, the calculation ends and the Volume value is considered to be the cumulative volume.

The second method for calculating the volume may require building of a hierarchy of dimensions, calculating the value of every point in every dimension, and setting the volume of the specific point in a sub-dimension to the value of the pattern in that point.

Another method may combine elements of the above described two methods, where a different method is used for each dimension. Regardless of the method, a multidimensional pattern-based scorecard may be calculated similarly to a single-dimension scorecard, with the exception that the volume used at different points may be different.

Turning now to FIG. 19, there is described the process of calculating a pattern based scorecard when all the involved dimensions are discrete. Step 1900 sets the sets K to the number of dimensions. Step 1905, initializes $i_1$, setting the number of processed intervals in the first dimension to 0. Next step 1910 initializes $i_2$, which sets the number of processed intervals in the second dimension to 0. This is done for all the K dimensions, step 1915, does it for the $k^{th}$ dimension. Each of tie Steps 1905, to 1915 is the staring point for an iterative loop over the correspondent dimension. Step 1920 sets the score on the point $i_1, i_2, \ldots i_k$, to be the flatten score multiplied by the volume at the point, denoted by $P(i_1, i_2, \ldots i_k)$, divided by the total volume. Step 1925 checks if the all the points in the loop for the $k^{th}$ dimension were processed, if not, $i_k$ is incremented in step 1930, and the loop continues to step 1920 to process the next interval in the $k^{th}$ dimension. Similar or steps are done for all the dimensions, step 1935 checks if the all the points in the loop for the second dimension were processed if not, $i_2$ is incremented in step 1940, and the loop continues to step 1915 to process the next interval in the second dimension. Step 1945 checks if the all the points in the loop for the first dimension were processed, if not, $i_i$ is incremented in step 1950, and the loop continues to step 1910 to process the next interval in the first dimension. When step 1955 is reached, the calculation ends and the scare for each point in the multidimensional graph has been calculated.

What is claimed:

1. A method for use in a telecommunication network for allocating network resources to a plurality of users, said method comprises the steps of:
   a) providing a plurality of time intervals each starting at a time of the day different from the other time intervals;
   b) for each of said plurality of users, associating, for each of the plurality of time intervals, a corresponding characteristic consumption of network resources which is based on past utilization of network resources during that respective time interval by the respective user, wherein at least two of each user's characteristic consumption of network resources that correspond each to a different time interval, are different from each other;
   c) based on a service level agreement associated with each of said plurality of users, determining a minimum level of service guaranteed to each respective user;
   d) prior to the time of the day at which a respective future time interval is due to start, aggregating the characteristic consumption of network resources by all users that are currently active, and determining said aggregated value to be an aggregated expected consumption of network resources for that future time interval;
   e) comparing the aggregated expected consumption of network resources with currently available network resources, and determining whether the aggregated expected consumption of network resources for that time interval is greater than the currently available network resources;
   f) if the aggregated expected consumption of network resources for that time interval by all currently active users is determined to be greater than the currently available network resources, identifying the currently active users whose respective characteristic consumption of network resources associated with said future time interval, exceeds their respective minimum level of service guaranteed; and
   g) allocating for at least one of currently active users identified, network resources which are less than the characteristic consumption of network resources associated with that user for that time interval, but which are not less than the minimum level of service guaranteed for the user, wherein said allocation is made while ensuring that each of the currently active users will be provided during that future time interval with network resources that are in conformity with at least the minimum level of service guaranteed to that respective user.

2. The method of claim 1, wherein step f) further comprises associating a score that indicates to the telecommunication network's operator a value associated with each of the currently active users identified, and wherein the step of allocating network resources carried out in step g) is based upon the respective scores associated with the currently active users identified.

3. The method of claim 2, wherein the allocation of network resources is carried out by first reducing network resources before allocating them to the currently active users identified, who are associated with the lowest scores for that future time interval from among the scores associated with the currently active users identified, and repeating this step until the aggregated expected consumption of network resources for that future time interval by all currently active users, matches the currently available network resources.

4. The method of claim 2, wherein no reduction in network resources will be effected for said future time interval for users included among the currently active users identified, who are associated with a score that is higher than a predefined threshold.

5. The method of claim 1, wherein at least one of the time intervals is divided into sub-time intervals, and the allocation of network resources for at least one active user in that time interval is changed for one or more but less than all of said sub-time intervals.

* * * * *